United States Patent
Ekstrand et al.

(10) Patent No.: US 10,607,380 B2
(45) Date of Patent: Mar. 31, 2020

(54) INFORMATION DISPLAY METHOD AND TERMINAL

(71) Applicant: Huawei Technologies Co., Ltd., Shenzhen (CN)

(72) Inventors: Simon Ekstrand, Lund (SE); Sha Qian, Shenzhen (CN); Jun Liang, Shenzhen (CN); Xueyan Huang, Shenzhen (CN); Shouyu Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/362,348

(22) Filed: Mar. 22, 2019

(65) Prior Publication Data
US 2019/0221017 A1 Jul. 18, 2019

Related U.S. Application Data

(63) Continuation of application No. PCT/CN2017/102967, filed on Sep. 22, 2017.

(30) Foreign Application Priority Data

Sep. 23, 2016 (CN) .......................... 2016 1 0848122

(51) Int. Cl.
*G06T 13/80* (2011.01)
*G06F 8/61* (2018.01)
(Continued)

(52) U.S. Cl.
CPC .......... *G06T 11/206* (2013.01); *G06F 3/0481* (2013.01); *G06F 8/61* (2013.01);
(Continued)

(58) Field of Classification Search
CPC .................................................... G06T 11/206
See application file for complete search history.

(56) References Cited

U.S. PATENT DOCUMENTS

| 2004/0139217 A1* | 7/2004 | Kidney | G06F 3/0346 |
| | | | 709/232 |
| 2009/0309548 A1* | 12/2009 | Carkner | H02J 7/0047 |
| | | | 320/136 |

(Continued)

FOREIGN PATENT DOCUMENTS

| CN | 1635471 A | 7/2005 |
| CN | 101295244 A | 10/2008 |

(Continued)

OTHER PUBLICATIONS

Machine Translation and Abstract of Chinese Publication No. CN1635471, Jul. 6, 2005, 9 pages.

(Continued)

*Primary Examiner* — Jitesh Patel
(74) *Attorney, Agent, or Firm* — Conley Rose, P.C.

(57) ABSTRACT

An information display method and a terminal, where the information display method includes detecting whether a terminal is currently connected to an external device, transmitting a transmission object between the terminal and the external device when the terminal is currently connected to the external device, and displaying a progress graph and a transmission dynamic animation on a screen of the terminal when the transmission object is transmitted between the terminal and the external device, where the transmission dynamic animation includes an object graph that moves from a start position on the screen to an end position on the screen and disappears at the end position, and the object graph is used to indicate the transmission object. According to the foregoing method, a user can have better experience (Continued)

in perceiving a status of the connection between the terminal and the external device.

20 Claims, 12 Drawing Sheets

(51) Int. Cl.
*G06F 8/65* (2018.01)
*G06F 3/0481* (2013.01)
*G06T 11/20* (2006.01)
*H04M 1/725* (2006.01)

(52) U.S. Cl.
CPC ............... *G06F 8/65* (2013.01); *G06T 13/80* (2013.01); *H04M 1/72544* (2013.01); *H04M 1/72527* (2013.01)

(56) References Cited

U.S. PATENT DOCUMENTS

| | | | |
|---|---|---|---|
| 2010/0083159 | A1 | 4/2010 | Mountain |
| 2013/0046641 | A1* | 2/2013 | DeVree ................. G06Q 30/02 705/14.69 |
| 2015/0135194 | A1 | 5/2015 | Alvarez Cavazos et al. |
| 2016/0112086 | A1 | 4/2016 | Lei |
| 2016/0248926 | A1* | 8/2016 | Yasuda .............. H04N 1/00307 |

FOREIGN PATENT DOCUMENTS

| | | |
|---|---|---|
| CN | 101727269 A | 6/2010 |
| CN | 101888440 A | 11/2010 |
| CN | 102340601 A | 2/2012 |
| CN | 102572076 A | 7/2012 |
| CN | 102752439 A | 10/2012 |
| CN | 104427131 A | 3/2015 |
| CN | 303439373 S | 11/2015 |
| CN | 105144116 A | 12/2015 |
| CN | 303655311 S | 4/2016 |
| CN | 105578811 A | 5/2016 |
| CN | 106468998 A | 3/2017 |
| EP | 2991328 A1 | 3/2016 |
| WO | 2011099737 A2 | 8/2011 |

OTHER PUBLICATIONS

Machine Translation and Abstract of Chinese Publication No. CN101295244, Oct. 29, 2008, 10 pages.
Machine Translation and Abstract of Chinese Publication No. CN101727269, Jun. 9, 2010, 10 pages.
Machine Translation and Abstract of Chinese Publication No. CN101888440, Nov. 17, 2010, 15 pages.
Machine Translation and Abstract of Chinese Publication No. CN102340601, Feb. 1, 2012, 10 pages.
Machine Translation and Abstract of Chinese Publication No. CN102572076, Jul. 11, 2012, 21 pages.
Machine Translation and Abstract of Chinese Publication No. CN102752439, Oct. 24, 2012, 12 pages.
Machine Translation and Abstract of Chinese Publication No. CN104427131, Mar. 18, 2015, 29 pages.
Machine Translation and Abstract of Chinese Publication No. CN106468998, Mar. 1, 2017, 77 pages.
Machine Translation and Abstract of Chinese Publication No. CN303439373, Nov. 11, 2015, 1 page.
Machine Translation and Abstract of Chinese Publication No. CN303655311, Apr. 27, 2016, 1 page.
Foreign Communication From A Counterpart Application, Chinese Application No. 201610848122.5, Chinese Office Action dated Jan. 2, 2019, 9 pages.
Foreign Communication From A Counterpart Application, PCT Application No. PCT/CN2017/102967, English Translation of International Search Report dated Dec. 28, 2017, 2 pages.
Foreign Communication From A Counterpart Application, PCT Application No. PCT/CN2017/102967, English Translation of Written Opinion dated Dec. 28, 2017, 7 pages.

* cited by examiner

INFORMATION DISPLAY METHOD AND TERMINAL

CROSS-REFERENCE TO RELATED APPLICATIONS

This application is a continuation of International Patent Application No. PCT/CN2017/102967 filed on Sep. 22, 2017, which claims priority to Chinese Patent Application No. 201610848122.5 filed on Sep. 23, 2016. The disclosures of the aforementioned applications are hereby incorporated by reference in their entireties.

TECHNICAL FIELD

The present disclosure relates to the field of computers, and in particular, to an information display method and a terminal.

BACKGROUND

At present, when a terminal is connected to an external device, the terminal often cannot display a status of the connection between the external device and the terminal, or often displays a status of the connection in a relatively undiversified manner. A user often fails to obtain more information about the status of the connection. For example, when the user listens to music in the terminal using a headphone, public play of sound is stopped, and the sound changes to be played using the headphone. If the user hears no music when plugging the headphone in, the user does not know whether the headphone is successfully plugged in and is in operation. Alternatively, when the user charges the terminal, the terminal displays only a current electricity quantity of the terminal. Therefore, display of an existing terminal affects experience of a user in perceiving a connection status.

SUMMARY

An objective of embodiments of the present disclosure is to provide an information display method and an apparatus such that a user can have better experience in perceiving a status of a connection between a terminal and an external device.

The foregoing objective and other objectives are achieved using characteristics in independent claims. Further implementations are embodied in dependent claims, the specification, and the accompanying drawings.

According to a first aspect, an information display method is provided. The method is performed by a terminal, and the method includes detecting whether the terminal is currently connected to an external device, when the terminal is currently connected to the external device, transmitting a transmission object between the terminal and the external device, and when the transmission object is transmitted between the terminal and the external device, displaying a progress graph and a transmission dynamic animation on a screen of the terminal, where the progress graph is used to indicate a current transmission progress of the transmission object, the transmission dynamic animation includes an object graph that moves from a start position on the screen to an end position on the screen and disappears at the end position, and the object graph is used to indicate the transmission object, and when a transmission direction of the transmission object is from the external device to the terminal, the start position is a position on the screen that corresponds to the external device, and the end position is a position of the progress graph, or when a transmission direction of the transmission object is from the terminal to the external device, the start position is a position of the progress graph, and the end position is a position on the screen that corresponds to the external device. Therefore, a user can more strongly perceive a status of the connection between the terminal and the external device, thereby bringing better experience.

The position on the screen that corresponds to the external device may be preset.

Before displaying a progress graph, the method may further include obtaining a current transmission progress of the transmission object.

The transmission dynamic animation may further include a dynamic picture showing that the object graph appears at the start position. To be specific, the transmission dynamic animation may be a dynamic picture showing that the object graph appears at the start position on the screen, and the object graph moves to the end position on the screen and then disappears at the end position.

Before displaying a transmission dynamic animation, the method may further include obtaining the start position and the end position. The start position and the end position may be preset. Further, obtaining the start position and the end position may further include determining, based on a preset first correspondence, the start position corresponding to the transmission object and the end position corresponding to the transmission object. Alternatively, obtaining the start position and the end position may include determining, based on a preset second correspondence, the start position and the end position that correspond to an event type (or an event identifier) of an event used to indicate the transmission of the transmission object. A shape and a color of the object graph may be fixed, or a shape and a color of the object graph may be variable.

There may be at least two object graphs. Colors of the object graphs may be different. Transparency of the object graphs may be different. Moving speeds of the object graphs may be different. Spacings between the object graphs may be different.

The shape of the object graph may include at least one of a square, a triangle, a circle, a star shape, an irregular shape, and a circle.

The object graph may move along a straight line, or the object graph may move along a curve. The curve may be a curve that can be expressed by a function or may be an irregular curve.

According to the first aspect, in a first possible implementation of the first aspect, the method further includes, when the transmission object is all transmitted, displaying a completion dynamic picture, where the completion dynamic picture includes a dynamic picture showing that a remaining object graph that is already displayed in the object graph and does not disappear moves to the end position and then disappears at the end position, or the completion dynamic picture includes a dynamic picture showing that the remaining object graph moves to the start position and then disappears at the start position. In the completion dynamic picture, a new object graph may no longer appear at the start position. Therefore, the user better perceives the completion of the transmission.

The remaining object graph that is already displayed in the object graph and does not disappear may be understood as a remaining object graph that already appears in the object graph and does not disappear.

According to the first implementation of the first aspect, in a second possible implementation of the first aspect, in the completion dynamic picture, transparency of the remaining object graph gradually increases and then the remaining object graph disappears, or in the completion dynamic picture, a color of the remaining object graph changes to a preset completion color. Therefore, the user better perceives the completion of the transmission.

According to any one of the first aspect or the foregoing implementations of the first aspect, in a third possible implementation of the first aspect, the method further includes, when the transmission of the transmission object is paused, displaying a pause picture showing that the remaining object graph that is already displayed in the object graph and does not disappear stops moving. Transparency of the remaining object graph in the pause picture may be greater than transparency of the object graph in the transmission dynamic animation. In the pause picture, a new object graph may no longer appear at the start position. Therefore, the user better perceives the pause of the transmission and the terminal.

Alternatively, the pause picture may be displayed when the transmission of the transmission object is interrupted.

According to the third implementation of the first aspect, in a fourth possible implementation of the first aspect, the method further includes, when the transmission of the transmission object is resumed, displaying a dynamic picture showing that the remaining object graph moves to the end position and then disappears at the end position. Therefore, the user can better perceive the resumption of the transmission. In the dynamic picture, a new object graph may appear at the start position.

According to any one of the first aspect or the foregoing implementations of the first aspect, in a fifth possible implementation of the first aspect, displaying a transmission dynamic animation includes displaying the transmission dynamic animation within preset duration.

According to any one of the foregoing implementations, in a sixth possible implementation of the first aspect, displaying a completion dynamic picture includes displaying the completion dynamic picture within preset duration.

According to any one of the first aspect or the foregoing implementations of the first aspect, in a seventh possible implementation of the first aspect, the external device includes a charging device, the transmission object includes electric energy, and that the terminal is currently connected to the external device includes the terminal is currently connected to the charging device using a charging cable or through wireless charging, and when the terminal is currently connected to the charging device using the charging cable, the start position is on a boundary of the screen, the start position and a charging interface of the terminal are on a same side of a center of the screen, and the start position is in a plug direction of the charging interface, and the end position is the position of the progress graph, or when the terminal is currently connected to the charging device through wireless charging, the start position is on a boundary of the screen, and the start position is on each of two sides of the screen, and the end position is the position of the progress graph. Therefore, the user can perceive a used charging manner and perceive a charging process.

That the charging device transmits electric energy to the terminal may mean that the charging device charges the terminal.

The event used to indicate the transmission of the transmission object may include an event used to indicate that the terminal is currently connected to the charging device using the charging cable or through wireless charging.

The progress graph is used to indicate a current electricity quantity of the terminal.

The charging interface is a socket of the charging cable of the terminal.

The method further includes displaying a remaining charging time at a preset position on the screen.

The transmission dynamic animation may include a dynamic picture showing that an object graph appears at the start position on the screen of the terminal, the object graph rotates around the progress graph and gradually approaches the progress graph, and the object graph moves to the position of the progress graph and then disappears at the position of the progress graph. "Around" may be clockwise around or anticlockwise around.

A color of the object graph may be an achromatic color or white, to be applicable to a charging scenario in which the screen is turned on.

That the start position and the charging interface of the terminal are on the same side of the center of the screen may mean that the start position and the charging interface of the terminal are on a same side of the screen, or may mean that the start position and the charging interface of the terminal are both at an upper part of the screen, or may mean that the start position and the charging interface of the terminal are both at a lower part of the screen, or may mean that the start position and the charging interface of the terminal are both on a left side of the screen, or may mean that the start position and the charging interface of the terminal are both on a right side of the screen.

When the terminal is currently connected to the charging device using the charging cable, the start position is obtained based on a position of the charging interface in the terminal or a position of the charging interface relative to the screen. Further, the position of the charging interface in the terminal or the position of the charging interface relative to the screen may be prestored or preset.

According to the seventh implementation of the first aspect, in an eighth possible implementation of the first aspect, the progress graph is a circle, and a current radius of the progress graph is in a positive correlation with a current electricity quantity of the terminal. Therefore, perception of the current electricity quantity by the user is enhanced.

The current electricity quantity of the terminal may be expressed as a percentage.

When a value of one of two variables becomes larger, a value of the other variable becomes larger such that the two variables are in a positive correlation. There may be a linear or non-linear value relationship between the two variables.

According to the seventh or eighth implementation of the first aspect, in a ninth possible implementation of the first aspect, at least one of a current moving speed of the object graph and a current size of the object graph is in a positive correlation with a voltage currently provided by the charging device, or at least one of a current moving speed of the object graph and a current size of the object graph is in a positive correlation with a current that is input into the terminal. Therefore, the user can perceive the currently provided voltage or current.

According to any one of the seventh to ninth implementations of the first aspect, in a tenth possible implementation of the first aspect, when the current electricity quantity of the terminal is less than or equal to a preset low-electricity-quantity threshold, a color of the object graph is a preset color indicating a low electricity quantity, or when the current electricity quantity of the terminal is greater than the low-electricity-quantity threshold and is less than a preset high-electricity-quantity threshold, a color of the object graph is a preset color indicating a medium electricity quantity, or when the current electricity quantity of the terminal is greater than or equal to the high-electricity-quantity threshold, a color of the object graph is a preset color indicating a high electricity quantity. Therefore, the user more intuitively perceives the current electricity quantity.

According to any one of the first aspect or the first to sixth implementations of the first aspect, in an eleventh possible implementation of the first aspect, the external device includes a storage device having a communication function, the transmission object includes data information, the terminal is in a wireless connection to the storage device, and the position on the screen that corresponds to the external device includes a position of a radio signal icon on the screen. Therefore, the user better perceives a file transmission process.

In the present disclosure, the wireless connection is a connection manner for performing wireless communication, and the wireless communication indicates communication established on the wireless connection.

The event used to indicate the transmission of the transmission object may include an event used to indicate that the terminal is currently in a wireless connection to the storage device.

The progress graph is used to indicate a transmission progress of current data.

The progress graph may be a circle, and a current radius of the progress graph may be in a positive correlation with a transmission completion rate of the data information. The completion rate may be expressed as a percentage.

Alternatively, that the terminal is currently connected to the external device may include that the terminal is currently connected to the storage device using a data cable, the position on the screen that corresponds to the external device may be on a boundary of the screen, the position on the screen that corresponds to the external device and a socket of the data cable of the terminal are on a same side of a center of the screen, and the position on the screen that corresponds to the external device is in a plug direction of the socket of the data cable of the terminal.

According to the eleventh implementation of the first aspect, in a twelfth possible implementation of the first aspect, at least one of a current moving speed of the object graph and a current size of the object graph is in a positive correlation with a current transmission speed of the data information. Therefore, the user better perceives the current transmission speed.

According to the eleventh or twelfth implementation of the first aspect, in a thirteenth possible implementation of the first aspect, the data information is an installation file of an application or an update file of the application, a transmission direction of the data information is from the external device to the terminal, the progress graph is an icon for a download status of the application or an icon for an update status of the application, the icon for the download status is used to display a current download progress, and the icon for the update status is used to display a current update progress.

According to a second aspect, an information display method is provided. The method is performed by a terminal, and the method includes, when the terminal establishes a telephone connection to another terminal, displaying a profile picture on a screen of the terminal, where the profile picture is used to indicate the other terminal, detecting whether the terminal receives audio data used to indicate a telephone voice of a user of the terminal, and when receiving the audio data, displaying a transmission dynamic animation on the screen, where the transmission dynamic animation includes a dynamic picture showing that an object graph appears at a start position on the screen, and the object graph moves to a position of the profile picture and then disappears at the position of the profile picture, and the object graph is used to indicate the audio data. Therefore, the user better perceives input and transmission of the telephone voice.

Before the displaying a profile picture, the method may further include obtaining, based on a preset or prestored correspondence, a profile picture corresponding to the other terminal. Further, the profile picture corresponding to the other terminal may be a profile picture corresponding to a telephone number of the other terminal. The profile picture may be, for example, but is not limited to, an image of a user of the other terminal.

Alternatively, the profile picture may be preset.

Before the displaying a profile picture, the method may further include obtaining the start position and the position of the profile picture. The start position and the position of the profile picture may be preset. Further, obtaining the start position and the position of the profile picture may further include obtaining, based on a preset correspondence, the start position and the position of the profile picture that correspond to an event type (or an event identifier) of an event used to indicate that the terminal receives the audio data.

That the profile picture is used to indicate the other terminal may include the profile picture indicates the user of the other terminal.

The displaying a transmission dynamic animation may include displaying the transmission dynamic animation within preset duration.

According to the second aspect, in a first possible implementation of the second aspect, when the audio data is from a device that has a microphone and that is in a wireless connection to the terminal, the start position is a position of a radio signal icon on the screen, or when the audio data is from a device that has a microphone and that is in a wired connection to the terminal using a headset jack of the terminal, the start position is on a boundary of the screen, the start position and the headset jack are on a same side of a center of the screen, and the start position is in a plug direction of the headset jack, or when the audio data is from a microphone of the terminal, the start position is on a boundary of the screen, and the start position and the microphone of the terminal are on a same side of a center of the screen. Therefore, the user better perceives an input manner of the telephone voice.

The event used to indicate that the terminal receives the audio data may include an event used to indicate that the audio data is from the device that has a microphone and that is in a wireless connection to the terminal, an event used to indicate that the audio data is from the device that has a microphone and that is in a wired connection to the terminal using the headset jack of the terminal, or an event used to indicate that the audio data is from the microphone of the terminal.

When the audio data is from the microphone of the terminal, the start position is further close to a position of the microphone of the terminal.

When the audio data is from the device that has a microphone and that is in a wired connection to the terminal using the headset jack of the terminal, the start position may be obtained based on a position of the headset jack in the terminal or a position of the headset jack relative to the screen. The position of the headset jack in the terminal or the position of the headset jack relative to the screen may be prestored or preset.

When the audio data is from the microphone of the terminal, the start position may be obtained based on a position of the microphone in the terminal or a position of the microphone relative to the screen, and the position of the microphone in the terminal or the position of the microphone relative to the screen may be prestored or preset.

According to the second aspect or the first implementation of the second aspect, in a second possible implementation of the second aspect, the method further includes, when a call on the telephone connection is completed, displaying a completion dynamic picture, where the completion dynamic picture includes a dynamic picture showing that a remaining object graph that is already displayed in the object graph and does not disappear moves to the position of the profile picture and then disappears at the position of the profile picture, or the completion dynamic picture includes a dynamic picture showing that the remaining object graph moves to the start position and then disappears at the start position. Therefore, the user better perceives the completion of the call. In the completion dynamic picture, a new object graph may no longer appear at the start position.

There may be at least two object graphs.

Displaying a completion dynamic picture may include displaying the completion dynamic picture within preset duration.

According to the second implementation of the second aspect, in a third possible implementation of the second aspect, in the completion dynamic picture, transparency of the remaining object graph gradually increases and then the remaining object graph disappears, or in the completion dynamic picture, a color of the remaining object graph changes to a preset completion color. Therefore, the user better perceives the completion of the call.

According to any one of the second aspect or the foregoing implementations of the second aspect, in a fourth possible implementation of the second aspect, a current moving speed of the object graph is in a positive correlation with a current speaking speed of the telephone voice, or a current size of the object graph is in a negative correlation with a current speaking speed of the telephone voice, and a higher current speaking speed of the telephone voice indicates a smaller current size of the object graph. Therefore, the user better perceives a speaking speed of the telephone voice.

A speaking speed may be expressed as a quantity of words included within preset duration, for example, a quantity of words per minute or a quantity of characters per minute. A current speaking speed is a quantity of words included within a period of time before a current moment. A higher quantity indicates a higher speaking speed.

A size of the object graph may be expressed as a perimeter of the object graph, and a larger perimeter indicates a larger size of the object graph, or a size of the object graph may be expressed as an area of the object graph, and a larger area indicates a larger size of the object graph.

When a value of one of two variables becomes larger, a value of the other variable becomes smaller such that the two variables are in a negative correlation. There may be a linear or non-linear value relationship between the two variables.

According to any one of the second aspect or the foregoing implementations of the second aspect, in a fifth possible implementation of the second aspect, when a current frequency of the telephone voice is less than or equal to a preset low-frequency threshold, a shape of the object graph is a preset low-frequency shape, or when a current frequency of the telephone voice is greater than the low-frequency threshold and is less than a preset high-frequency threshold, a shape of the object graph is a preset intermediate-frequency shape, or when a current frequency of the telephone voice is greater than or equal to the high-frequency threshold, a shape of the object graph is a preset high-frequency shape. Therefore, the user better perceives frequency information of the telephone voice.

According to a third aspect, an information display method is provided. The method is performed by a terminal, and the method includes, when music corresponding to audio data is played, displaying a disc graph on a screen of the terminal, where the disc graph is used to indicate the music, detecting whether the terminal currently outputs the audio data to a playback device, and when the terminal currently outputs the audio data to the playback device, displaying a transmission dynamic animation on the screen, where the transmission dynamic animation is a dynamic picture showing that an object graph appears at a position of the disc graph on the screen, and the object graph moves to an end position and then disappears at the end position, and the object graph is used to indicate the audio data. Therefore, a user better perceives a transmission process of the audio data.

Before displaying a disc graph, the method may further include obtaining the disc graph. Further, the disc graph may be an image of a singer of the music, or may be a cover image of an album to which the music belongs. The disc graph may be prestored or preset.

Before the displaying a disc graph, the method may further include obtaining the position of the disc graph and the end position. The position of the disc graph and the end position may be preset. Further, obtaining the position of the disc graph and the end position may further include obtaining, based on a preset correspondence, the position of the disc graph and the end position that correspond to an event type (or an event identifier) of an event used to indicate that the terminal outputs the audio data to the playback device.

When the music corresponding to the audio data is played, and the terminal is currently not connected to a music play application, a dynamic picture showing that the object graph appears at the position of the disc graph, and the object graph rotates around the disc graph is displayed on the screen of the terminal, and when the terminal currently outputs the audio data to the playback device, the dynamic picture showing that the object graph moves to the end position and then disappears at the end position is displayed.

When the terminal currently outputs the audio data to the playback device, the transmission dynamic animation is displayed. Alternatively, when the terminal currently establishes a transmission connection to the playback device, the transmission dynamic animation may be displayed.

According to the third aspect, in a first possible implementation of the third aspect, when the terminal is in a wireless connection to the playback device, and the terminal currently outputs the audio data to the playback device, the end position is a position of a radio signal icon on the screen, or when the terminal is in a wired connection to the playback device using a headset jack, and the terminal currently outputs the audio data to the playback device, the end position is on a boundary of the screen of the terminal, the end position and the headset jack are on a same side of a center of the screen, and the end position is in a plug direction of the headset jack. Therefore, the user better perceives a transmission manner of the audio data.

When the terminal is in a wired connection to the playback device using the headset jack, and the terminal currently outputs the audio data to the playback device, the end position may be obtained based on a position of the headset jack in the terminal or a position of the headset jack relative to the screen. The position of the headset jack in the terminal or the position of the headset jack relative to the screen may be prestored or preset.

The event used to indicate that the terminal outputs the audio data to the playback device may include an event used to indicate that the terminal is in a wireless connection to the playback device, and the terminal currently outputs the audio data to the playback device, or an event used to indicate that the terminal is in a wired connection to the playback device using the headset jack, and the terminal currently outputs the audio data to the playback device.

According to the third aspect or the first implementation of the third aspect, in a second possible implementation of the third aspect, displaying a transmission dynamic animation includes displaying the transmission dynamic animation within preset duration.

According to any one of the third aspect or the foregoing implementations of the third aspect, in a third possible implementation of the third aspect, when a current frequency of the music is less than or equal to a preset low-frequency threshold, a shape of the object graph is a preset low-frequency shape, or when a current frequency of the music is greater than the low-frequency threshold and is less than a preset high-frequency threshold, a shape of the object graph is a preset intermediate-frequency shape, or when a current frequency of the music is greater than or equal to the high-frequency threshold, a shape of the object graph is a preset high-frequency shape. Therefore, the user better perceives current frequency information of the music.

According to any one of the third aspect or the foregoing implementations of the third aspect, in a fourth possible implementation of the third aspect, a current moving speed of the object graph is in a positive correlation with a current rhythm of the music, or a current size of the object graph is in a negative correlation with a current rhythm of the music, and a faster current rhythm of the music indicates a smaller current size of the object graph. Therefore, the user better perceives the current rhythm of the music.

A rhythm of music is lengths and strength of tones in the music. A faster rhythm of the music may indicate a higher alternation frequency of strong and weak tones in the music. Whether a tone is a strong tone or a weak tone may be measured using a preset absolute threshed for a sound. Alternatively, a relative value of a strength change of a tone in the music may be compared with a preset relative threshold, to measure whether the tone in the music changes from a strong tone to a weak tone, or changes from a weak tone to a strong tone.

According to any one of the third aspect or the foregoing implementations of the third aspect, in a fifth possible implementation of the third aspect, in the transmission dynamic animation, a quantity of object graphs that appear per second is in a positive correlation with resolution of the audio data. Therefore, the user better perceives the resolution of the audio data.

The resolution of the audio data is at least one of a sampling rate of the audio data and a quantity of bits of each sampling point of the music.

According to any one of the third aspect or the foregoing implementations of the third aspect, in a sixth possible implementation of the third aspect, the method further includes, when the terminal currently does not output the audio data to the playback device, displaying a silent dynamic picture, where the silent dynamic picture is a dynamic picture showing that a remaining object graph that is already displayed in the object graph and does not disappear moves to the end position and then disappears at the end position. In the silent dynamic picture, a new object graph may no longer appear at the position of the disc graph. Therefore, the user better perceives whether a sound is currently output.

That the terminal currently does not output the audio data to the playback device may be that the music is paused, or may be that play of a song is completed and a new song does not start to be played, or may be that a silent part in the music is played, or may be that the connection between the terminal and the playback device is currently interrupted.

According to any one of the third aspect or the foregoing implementations of the third aspect, in a seventh possible implementation of the third aspect, the method further includes, when the music is paused, displaying a pause picture showing that the remaining object graph that is already displayed in the object graph and does not disappear stops moving. Transparency of the remaining object graph in the pause picture is greater than transparency of the object graph in the transmission dynamic animation. Therefore, the user better perceives the pause of the music. In the pause picture, a new object graph may no longer appear at the position of the disc graph.

According to the seventh implementation of the third aspect, in an eighth possible implementation of the third aspect, the method further includes, when the play of the music is resumed, displaying a dynamic picture showing that the remaining object graph moves to the end position and then disappears at the end position. Therefore, the user better perceives the resumption of the play of the music. In the dynamic picture, a new object graph may appear at the position of the disc graph.

According to a fourth aspect, an information display method is provided. The method is performed by a terminal, and the method includes detecting whether a volume up button of the terminal is pressed, where the volume up button is used by a user to increase a volume of the terminal, and when the volume up button is pressed, displaying a volume graph on a screen of the terminal, where the volume graph is used to indicate a current volume value of the terminal, and displaying a volume up dynamic picture on the screen, where the volume up dynamic picture is a dynamic picture showing that a volume up object graph appears at a start position on the screen, and the volume up object graph moves to a position of the volume graph and then disappears at the position of the volume graph, and the volume up object graph is used to indicate an instruction for increasing the volume. Therefore, the user better perceives whether the volume up button is successfully pressed.

Before displaying a volume graph, the method may further include obtaining the current volume value of the terminal.

Before the displaying a volume graph, the method may further include obtaining the start position and the position of the volume graph. The start position and the position of the volume graph may be preset. Further, obtaining the start position and the position of the volume graph may include obtaining, based on a preset correspondence, the position of the volume graph and the start position that correspond to an event type (or an event identifier) of an event used to indicate that the volume up button is pressed.

According to the fourth aspect, in a first possible implementation of the fourth aspect, the start position is on a boundary of the screen of the terminal, the start position and the volume up button of the terminal are on a same side of a center of the screen, and the start position is in a press direction of the volume up button.

The start position may be obtained based on a position of the volume up button on the terminal or a position of the volume up button relative to the screen. The position of the volume up button on the terminal or the position of the volume up button relative to the screen may be preset or prestored.

According to the fourth aspect or the first implementation of the fourth aspect, in a second possible implementation of the fourth aspect, the method further includes detecting whether a volume down button of the terminal is pressed, where the volume down button is used by the user to reduce the volume of the terminal, and when the volume down button is pressed, displaying a volume down dynamic picture on the screen, where the volume down dynamic picture is a dynamic picture showing that a volume down object graph appears at the position of the volume graph, and the volume down object graph moves to an end position on the screen of the terminal and then disappears at the end position, and the volume down object graph is used to indicate an instruction for reducing the volume. Therefore, the user better perceives whether the volume down button is successfully pressed. Before the displaying a volume graph, the method may further include obtaining the end position. The end position may be preset. Further, obtaining the end position may include obtaining, based on a preset correspondence, the end position corresponding to an event type (or an event identifier) of an event used to indicate that the volume down button is pressed.

According to the second implementation of the fourth aspect, in a third possible implementation of the fourth aspect, the end position is on a boundary of the screen of the terminal, the end position and the volume down button of the terminal are on a same side of the center of the screen, and the end position is in a press direction of the volume down button.

The end position may be obtained based on a position of the volume down button on the terminal or a position of the volume down button relative to the screen. The position of the volume down button on the terminal or the position of the volume down button relative to the screen may be preset or prestored.

According to the second implementation or the third implementation of the fourth aspect, in a fourth possible implementation of the fourth aspect, when the volume down button is pressed once, a quantity of volume down object graphs that appear at the position of the volume graph in the volume down dynamic picture is a preset quantity. Therefore, the user better perceives a quantity of successful presses.

According to any one of the fourth aspect or the foregoing implementations of the fourth aspect, in a fifth possible implementation of the fourth aspect, the volume graph is a circle, and a current radius of the volume graph is in a positive correlation with the current volume of the terminal.

According to any one of the fourth aspect or the foregoing implementations of the fourth aspect, in a sixth possible implementation of the fourth aspect, when the volume up button is pressed once, a quantity of volume up object graphs that appear at the start position in the volume up dynamic picture is a preset quantity. Therefore, the user better perceives a quantity of successful presses.

According to a fifth aspect, an information display method is provided. The method is performed by a terminal, and the method includes displaying a sound recording graph on a screen of the terminal, where the sound recording graph is used to indicate that a sound recording interface is opened, detecting whether the terminal receives audio data used to indicate a voice of a user of the terminal, and when the terminal receives the audio data, displaying a transmission dynamic animation on the screen, where the transmission dynamic animation is a dynamic picture showing that an object graph appears at a start position on the screen of the terminal, and the object graph moves to a position of the sound recording graph and then disappears at the position of the sound recording graph, and the object graph is used to indicate the audio data. Therefore, the user better perceives whether a sound is successfully recorded.

Before displaying a sound recording graph, the method may further include obtaining the sound recording graph. The sound recording graph may be preset.

Before displaying a sound recording graph, the method may further include obtaining the start position and the position of the sound recording graph. The start position and the position of the sound recording graph may be preset. Further, obtaining the start position and the position of the sound recording graph may include obtaining, based on a preset correspondence, the position of the sound recording graph and the start position that correspond to an event type (or an event identifier) of an event used to indicate that the terminal receives the audio data.

According to the fifth aspect, in a first possible implementation of the fifth aspect, when the audio data is from a device that has a microphone and that is in a wireless connection to the terminal, the start position is a position of a radio signal icon on the screen, or when the audio data is from a device that has a microphone and that is in a wired connection to the terminal using a headset jack of the terminal, the start position is on a boundary of the screen, the start position and the headset jack of the terminal are on a same side of a center of the screen, and the start position is in a plug direction of the headset jack, or when the audio data is from a microphone of the terminal, the start position is on a boundary of the screen of the terminal, and the start position and the microphone of the terminal are on a same side of a center of the screen. Therefore, the user better perceives an input manner of the voice.

When the audio data is from the device that has a microphone and that is in a wired connection to the terminal using the headset jack of the terminal, the start position may be obtained based on a position of the headset jack in the terminal or a position of the headset jack relative to the screen. The position of the headset jack in the terminal or the position of the headset jack relative to the screen may be prestored or preset.

When the audio data is from the microphone of the terminal, the start position may be obtained based on a position of the microphone in the terminal or a position of the microphone relative to the screen, and the position of the microphone in the terminal or the position of the microphone relative to the screen may be prestored or preset.

The event used to indicate that the terminal receives the audio data may include an event used to indicate that the audio data is from the device that has a microphone and that is in a wireless connection to the terminal, an event used to indicate that the audio data is from the device that has a microphone and that is in a wired connection to the terminal using the headset jack of the terminal, or an event used to indicate that the audio data is from the microphone of the terminal. When the audio data is from the microphone of the terminal, the start position is further close to a position of the microphone of the terminal.

According to the first implementation of the fifth aspect, in a second possible implementation of the fifth aspect, the microphone of the terminal includes at least two microphones, and when the audio data is from any one of the at least two microphones, the start position and the any one of the microphones are on a same side of the center of the screen. Therefore, the user better perceives a direction that the input voice is from.

According to any one of the fifth aspect or the foregoing implementations of the fifth aspect, in a third possible implementation of the fifth aspect, the method further includes when a sound recording function is completed or when the sound recording function is paused, displaying a completion dynamic picture, where the completion dynamic picture is a dynamic picture showing that a remaining object graph that is already displayed in the object graph and does not disappear moves to the position of the sound recording graph and then disappears at the position of the sound recording graph, or the completion dynamic picture is a dynamic picture showing that the remaining object graph moves to the start position and then disappears at the start position. In the completion dynamic picture, a new object graph may no longer appear at the start position. Therefore, the user better perceives completion or a pause of sound recording.

There may be at least two object graphs.

According to any one of the fifth aspect or the foregoing implementations of the fifth aspect, in a fourth possible implementation of the fifth aspect, a current moving speed of the object graph is in a positive correlation with a current speaking speed of the voice, or a current size of the object graph is in a negative correlation with a current speaking speed of the voice, and a higher current speaking speed of the voice indicates a smaller current size of the object graph. Therefore, the user better perceives the current speaking speed of the voice.

According to any one of the fifth aspect or the foregoing implementations of the fifth aspect, in a fifth possible implementation of the fifth aspect, when a current frequency of the voice is less than or equal to a preset low-frequency threshold, a shape of the object graph is a preset low-frequency shape, or when a current frequency of the voice is greater than the low-frequency threshold and is less than a preset high-frequency threshold, a shape of the object graph is a preset intermediate-frequency shape, or when a current frequency of the voice is greater than or equal to the high-frequency threshold, a shape of the object graph is a preset high-frequency shape. Therefore, the user better perceives the current frequency of the voice.

According to a sixth aspect, a terminal is provided. The terminal includes a detection module configured to detect whether the terminal is currently connected to an external device, a transmission module configured to when the detection module detects that the terminal is currently connected to the external device, transmit a transmission object between the terminal and the external device, and a display module configured to, when the transmission module transmits the transmission object between the terminal and the external device, display a progress graph and a transmission dynamic animation on a screen of the terminal, where the progress graph is used to indicate a current transmission progress of the transmission object, the transmission dynamic animation includes an object graph that moves from a start position on the screen to an end position on the screen and disappears at the end position, and the object graph is used to indicate the transmission object, where when a transmission direction of the transmission object is from the external device to the terminal, the start position is a position on the screen that corresponds to the external device, and the end position is a position of the progress graph, or when a transmission direction of the transmission object is from the terminal to the external device, the end position is a position on the screen that corresponds to the external device, and the start position is a position of the progress graph.

The display module may be further configured to obtain a current transmission progress of the transmission object.

The display module may be further configured to obtain the start position and the end position.

The display module may be further configured to determine, based on a preset first correspondence, the start position corresponding to the transmission object and the end position corresponding to the transmission object.

The display module may be further configured to determine, based on a preset second correspondence, the start position and the end position that correspond to an event type of an event used to indicate the transmission of the transmission object.

According to the sixth aspect, in a first possible implementation of the sixth aspect, the display module is further configured to, when the transmission object is all transmitted, display a completion dynamic picture, where the completion dynamic picture includes a dynamic picture showing that a remaining object graph that is already displayed in the object graph and does not disappear moves to the end position and then disappears at the end position, or the completion dynamic picture includes a dynamic picture showing that the remaining object graph moves to the start position and then disappears at the start position. In the completion dynamic picture, a new object graph may no longer appear at the start position.

According to the first implementation of the sixth aspect, in a second possible implementation of the sixth aspect, in the completion dynamic picture, transparency of the remaining object graph gradually increases and then the remaining object graph disappears, or in the completion dynamic picture, a color of the remaining object graph changes to a preset completion color.

According to any one of the sixth aspect or the foregoing implementations of the sixth aspect, in a third possible implementation of the sixth aspect, the display module is further configured to, when the transmission of the transmission object is paused, display a pause picture showing that the remaining object graph that is already displayed in the object graph and does not disappear stops moving. Transparency of the remaining object graph in the pause picture may be greater than transparency of the object graph in the transmission dynamic animation. In the pause picture, a new object graph may no longer appear at the start position.

According to the third implementation of the sixth aspect, in a fourth possible implementation of the sixth aspect, the display module is further configured to, when the transmission of the transmission object is resumed, display a dynamic picture showing that the remaining object graph moves to the end position and then disappears at the end position. In the dynamic picture, a new object graph may appear at the start position.

According to any one of the sixth aspect or the foregoing implementations of the sixth aspect, in a fifth possible implementation of the sixth aspect, the display module is configured to display the transmission dynamic animation within preset duration.

According to any one of the foregoing implementations of the sixth aspect, in a sixth possible implementation of the sixth aspect, the display module is configured to display the completion dynamic picture within preset duration.

According to any one of the sixth aspect or the foregoing possible implementations of the sixth aspect, in a seventh possible implementation of the sixth aspect, the external device includes a charging device, the transmission object includes electric energy, and that the terminal is currently connected to the external device includes the terminal is currently connected to the charging device using a charging cable or through wireless charging, and when the terminal is currently connected to the charging device using the charging cable, the start position is on a boundary of the screen, the start position and a charging interface of the terminal are on a same side of a center of the screen, and the start position is in a plug direction of the charging interface, and the end position is the position of the progress graph, or when the terminal is currently connected to the charging device through wireless charging, the start position is on a boundary of the screen, and the start position is on each of two sides of the screen, and the end position is the position of the progress graph.

According to the seventh implementation of the sixth aspect, in an eighth possible implementation of the sixth aspect, the progress graph is a circle, and a current radius of the progress graph is in a positive correlation with a current electricity quantity of the terminal.

According to the seventh or eighth implementation of the sixth aspect, in a ninth possible implementation of the sixth aspect, at least one of a current moving speed of the object graph and a current size of the object graph is in a positive correlation with a voltage currently provided by the charging device, or at least one of a current moving speed of the object graph and a current size of the object graph is in a positive correlation with a current that is input into the terminal.

According to any one of the seventh to ninth implementations of the sixth aspect, in a tenth possible implementation of the sixth aspect, when the current electricity quantity of the terminal is less than or equal to a preset low-electricity-quantity threshold, a color of the object graph is a preset color indicating a low electricity quantity, or when the current electricity quantity of the terminal is greater than the low-electricity-quantity threshold and is less than a preset high-electricity-quantity threshold, a color of the object graph is a preset color indicating a medium electricity quantity, or when the current electricity quantity of the terminal is greater than or equal to the high-electricity-quantity threshold, a color of the object graph is a preset color indicating a high electricity quantity.

According to any one of the sixth aspect or the first to sixth implementations of the sixth aspect, in an eleventh possible implementation of the sixth aspect, the external device includes a storage device having a communication function, the transmission object includes data information, the terminal is in a wireless connection to the storage device, and the position on the screen that corresponds to the external device includes a position of a radio signal icon on the screen.

According to the eleventh implementation of the sixth aspect, in a twelfth possible implementation of the sixth aspect, at least one of a current moving speed of the object graph and a current size of the object graph is in a positive correlation with a current transmission speed of the data information.

According to the eleventh or twelfth implementation of the sixth aspect, in a thirteenth possible implementation of the sixth aspect, the data information is an installation file of an application or an update file of the application, a transmission direction of the data information is from the external device to the terminal, the progress graph is an icon for a download status of the application or an icon for an update status of the application, the icon for the download status is used to display a current download progress, and the icon for the update status is used to display a current update progress.

According to a seventh aspect, a terminal is provided. The terminal includes a display module configured to, when the terminal establishes a telephone connection to another terminal, display a profile picture on a screen of the terminal, where the profile picture is used to indicate the other terminal, and a detection module configured to detect whether audio data used to indicate a telephone voice of a user of the terminal is received, where the display module is further configured to when the detection module detects that the terminal receives the audio data, display a transmission dynamic animation on the screen, where the transmission dynamic animation includes a dynamic picture showing that an object graph appears at a start position on the screen, and the object graph moves to a position of the profile picture and then disappears at the position of the profile picture, and the object graph is used to indicate the audio data.

The display module may be further configured to obtain, based on a preset or prestored correspondence, a profile picture corresponding to the other terminal.

The display module may be further configured to obtain the start position and the position of the profile picture.

The display module may be further configured to obtain, based on a preset correspondence, the start position and the position of the profile picture that correspond to an event type of an event used to indicate that the terminal establishes the telephone connection to the other terminal.

According to the seventh aspect, in a first possible implementation of the seventh aspect, when the audio data is from a device that has a microphone and that is in a wireless connection to the terminal, the start position is a position of a radio signal icon on the screen, or when the audio data is from a device that has a microphone and that is in a wired connection to the terminal using a headset jack of the terminal, the start position is on a boundary of the screen, the start position and the headset jack are on a same side of a center of the screen, and the start position is in a plug direction of the headset jack, or when the audio data is from a microphone of the terminal, the start position is on a boundary of the screen, and the start position and the microphone of the terminal are on a same side of a center of the screen.

According to the seventh aspect or the first implementation of the seventh aspect, in a second possible implementation of the seventh aspect, the display module is further configured to when a call on the telephone connection is completed, display a completion dynamic picture, where the completion dynamic picture includes a dynamic picture showing that a remaining object graph that is already displayed in the object graph and does not disappear moves to the position of the profile picture and then disappears at the position of the profile picture, or the completion dynamic picture includes a dynamic picture showing that the remaining object graph moves to the start position and then disappears at the start position. In the completion dynamic picture, a new object graph may no longer appear at the start position.

There may be at least two object graphs.

According to the second implementation of the seventh aspect, in a third possible implementation of the seventh aspect, in the completion dynamic picture, transparency of the remaining object graph gradually increases and then the remaining object graph disappears, or in the completion dynamic picture, a color of the remaining object graph changes to a preset completion color.

According to any one of the seventh aspect or the foregoing implementations of the seventh aspect, in a fourth possible implementation of the seventh aspect, a current moving speed of the object graph is in a positive correlation with a current speaking speed of the telephone voice, or a current size of the object graph is in a negative correlation with a current speaking speed of the telephone voice, and a higher current speaking speed of the telephone voice indicates a smaller current size of the object graph.

According to any one of the seventh aspect or the foregoing implementations of the seventh aspect, in a fifth possible implementation of the seventh aspect, when a current frequency of the telephone voice is less than or equal to a preset low-frequency threshold, a shape of the object graph is a preset low-frequency shape, or when a current frequency of the telephone voice is greater than the low-frequency threshold and is less than a preset high-frequency threshold, a shape of the object graph is a preset intermediate-frequency shape, or when a current frequency of the telephone voice is greater than or equal to the high-frequency threshold, a shape of the object graph is a preset high-frequency shape.

According to an eighth aspect, a terminal is provided. The terminal includes a display module configured to, when music corresponding to audio data is played, display a disc graph on a screen of the terminal, where the disc graph is used to indicate the music, and a detection module configured to detect whether the terminal currently outputs the audio data to a playback device, where the display module is further configured to when the detection module detects that the terminal currently outputs the audio data to the playback device, display a transmission dynamic animation on the screen, where the transmission dynamic animation is a dynamic picture showing that an object graph appears at a position of the disc graph on the screen, and the object graph moves to an end position and then disappears at the end position, and the object graph is used to indicate the audio data.

The display module may be further configured to obtain the disc graph.

The display module may be further configured to obtain the position of the disc graph and the end position.

The display module may be further configured to obtain, based on a preset correspondence, the position of the disc graph and the end position that correspond to an event type of an event used to indicate that the terminal outputs the audio data to the playback device.

According to the eighth aspect, in a first possible implementation of the eighth aspect, when the terminal is in a wireless connection to the playback device, and the terminal currently outputs the audio data to the playback device, the end position is a position of a radio signal icon on the screen, or when the terminal is in a wired connection to the playback device using a headset jack, and the terminal currently outputs the audio data to the playback device, the end position is on a boundary of the screen of the terminal, the end position and the headset jack are on a same side of a center of the screen, and the end position is in a plug direction of the headset jack.

According to the eighth aspect or the first implementation of the eighth aspect, in a second possible implementation of the eighth aspect, the display module is configured to display the transmission dynamic animation within preset duration.

According to any one of the eighth aspect or the foregoing implementations of the eighth aspect, in a third possible implementation of the eighth aspect, when a current frequency of the music is less than or equal to a preset low-frequency threshold, a shape of the object graph is a preset low-frequency shape, or when a current frequency of the music is greater than the low-frequency threshold and is less than a preset high-frequency threshold, a shape of the object graph is a preset intermediate-frequency shape, or when a current frequency of the music is greater than or equal to the high-frequency threshold, a shape of the object graph is a preset high-frequency shape.

According to any one of the eighth aspect or the foregoing implementations of the eighth aspect, in a fourth possible implementation of the eighth aspect, a current moving speed of the object graph is in a positive correlation with a current rhythm of the music, or a current size of the object graph is in a negative correlation with a current rhythm of the music, and a faster current rhythm of the music indicates a smaller current size of the object graph.

According to any one of the eighth aspect or the foregoing implementations of the eighth aspect, in a fifth possible implementation of the eighth aspect, in the transmission dynamic animation, a quantity of object graphs that appear per second is in a positive correlation with resolution of the audio data.

According to any one of the eighth aspect or the foregoing implementations of the eighth aspect, in a sixth possible implementation of the eighth aspect, the display module is further configured to, when the terminal currently does not output the audio data to the playback device, display a silent dynamic picture, where the silent dynamic picture is a dynamic picture showing that a remaining object graph that is already displayed in the object graph and does not disappear moves to the end position and then disappears at the end position. In the silent dynamic picture, a new object graph may no longer appear at the position of the disc graph.

According to any one of the eighth aspect or the foregoing implementations of the eighth aspect, in a seventh possible implementation of the eighth aspect, the display module is further configured to, when the music is paused, display a pause picture showing that the remaining object graph that is already displayed in the object graph and does not disappear stops moving. Transparency of the remaining object graph in the pause picture may be greater than transparency of the object graph in the transmission dynamic animation. In the pause picture, a new object graph may no longer appear at the position of the disc graph.

According to the seventh implementation of the eighth aspect, in an eighth possible implementation of the eighth aspect, the display module is further configured to, when the play of the music is resumed, display a dynamic picture showing that a graph that is already displayed in the object graph and does not disappear moves to the end position and then disappears at the end position. In the dynamic picture, a new object graph may appear at the position of the disc graph.

According to a ninth aspect, a terminal is provided. The terminal includes a detection module configured to detect whether a volume up button of the terminal is pressed, where the volume up button is used by a user to increase a volume of the terminal, and a display module configured to, when the detection module detects that the volume up button is pressed, display a volume graph on a screen of the terminal, where the volume graph is used to indicate a current volume value of the terminal, and display a volume up dynamic picture on the screen, where the volume up dynamic picture is a dynamic picture showing that a volume up object graph appears at a start position on the screen, and the volume up object graph moves to a position of the volume graph and then disappears at the position of the volume graph, and the volume up object graph is used to indicate an instruction for increasing the volume.

The display module may be further configured to obtain the current volume value of the terminal.

The display module may be further configured to obtain the start position and the position of the volume graph.

The display module may be further configured to obtain, based on a preset correspondence, the position of the volume graph and the start position that correspond to an event type of an event used to indicate that the volume up button is pressed. According to the ninth aspect, in a first possible implementation of the ninth aspect, the start position is on a boundary of the screen of the terminal, the start position and the volume up button of the terminal are on a same side of a center of the screen, and the start position is in a press direction of the volume up button.

According to the ninth aspect or the first implementation of the ninth aspect, in a second possible implementation of the ninth aspect, the detection module is further configured to detect whether a volume down button of the terminal is pressed, where the volume up button is used by the user to reduce the volume of the terminal, and the display module is further configured to, when the detection module detects that the volume down button is pressed, display a volume down dynamic picture on the screen, where the volume down dynamic picture is a dynamic picture showing that a volume down object graph appears at the position of the volume graph, and the volume down object graph moves to an end position on the screen of the terminal and then disappears at the end position, and the volume down object graph is used to indicate an instruction for reducing the volume.

According to the second implementation of the ninth aspect, in a third possible implementation of the ninth aspect, the end position is on a boundary of the screen of the terminal, the end position and the volume down button of the terminal are on a same side of the center of the screen, and the end position is in a press direction of the volume down button.

According to the second implementation or the third implementation of the ninth aspect, in a fourth possible implementation of the ninth aspect, when the volume down button is pressed once, a quantity of volume down object graphs that appear at the position of the volume graph in the volume down dynamic picture is a preset quantity.

According to any one of the ninth aspect or the foregoing implementations of the ninth aspect, in a fifth possible implementation of the ninth aspect, the volume graph is a circle, and a current radius of the volume graph is in a positive correlation with the current volume of the terminal.

According to any one of the ninth aspect or the foregoing implementations of the fourth aspect, in a sixth possible implementation of the ninth aspect, when the volume up button is pressed once, a quantity of volume up object graphs that appear at the start position in the volume up dynamic picture is a preset quantity.

According to a tenth aspect, a terminal is provided. The terminal includes a display module configured to display a sound recording graph on a screen of the terminal, where the sound recording graph is used to indicate that a sound recording interface is opened, and a detection module configured to detect whether the terminal receives audio data used to indicate a voice of a user of the terminal, where the display module is further configured to, when the detection module detects that the terminal receives the audio data, display a transmission dynamic animation on the screen, where the transmission dynamic animation is a dynamic picture showing that an object graph appears at a start position on the screen, and the object graph moves to the sound recording graph and then disappears at a position of the sound recording graph, and the object graph is used to indicate the audio data.

The display module may be further configured to obtain the sound recording graph.

The display module may be further configured to obtain the start position and the position of the sound recording graph.

The display module may be further configured to obtain, based on a preset correspondence, the position of the sound recording graph and the end position that correspond to an event type of an event used to indicate that the terminal receives the audio data.

After it is detected that the user enables a sound recording function, whether the terminal receives the audio data used to indicate the voice of the user of the terminal may be detected.

According to the tenth aspect, in a first possible implementation of the tenth aspect, when the audio data is from a device that has a microphone and that is in a wireless connection to the terminal, the start position is a position of a radio signal icon on the screen, or when the audio data is from a device that has a microphone and that is in a wired connection to the terminal using a headset jack of the terminal, the start position is on a boundary of the screen, the start position and the headset jack of the terminal are on a same side of a center of the screen, and the start position is in a plug direction of the headset jack, or when the audio data is from a microphone of the terminal, the start position is on a boundary of the screen of the terminal, and the start position and the microphone of the terminal are on a same side of a center of the screen.

According to the first implementation of the tenth aspect, in a second possible implementation of the tenth aspect, the microphone of the terminal includes at least two microphones, and when the audio data is from any one of the at least two microphones, the start position and the any one of the microphones are on a same side of the center of the screen.

According to any one of the tenth aspect or the foregoing implementations of the tenth aspect, in a third possible implementation of the tenth aspect, there are at least two object graphs, and the display module is further configured to, when the sound recording function is completed or when the sound recording function is paused, display a completion dynamic picture, where the completion dynamic picture is a dynamic picture showing that a remaining object graph that is already displayed in the object graph and does not disappear moves to the position of the sound recording graph and then disappears at the position of the sound recording graph, or the completion dynamic picture is a dynamic picture showing that the remaining object graph moves to the start position and then disappears at the start position. In the completion dynamic picture, a new object graph may no longer appear at the start position.

According to any one of the tenth aspect or the foregoing implementations of the tenth aspect, in a fourth possible implementation of the tenth aspect, a current moving speed of the object graph is in a positive correlation with a current speaking speed of the voice, or a current size of the object graph is in a negative correlation with a current speaking speed of the voice, and a higher current speaking speed of the voice indicates a smaller current size of the object graph.

According to any one of the tenth aspect or the foregoing implementations of the tenth aspect, in a fifth possible implementation of the tenth aspect, when a current frequency of the voice is less than or equal to a preset low-frequency threshold, a shape of the object graph is a preset low-frequency shape, or when a current frequency of the voice is greater than the low-frequency threshold and is less than a preset high-frequency threshold, a shape of the object graph is a preset intermediate-frequency shape, or when a current frequency of the voice is greater than or equal to the high-frequency threshold, a shape of the object graph is a preset high-frequency shape.

According to an eleventh aspect, an information display device is provided. The device includes a processor and a memory, where the memory is configured to store code, and the processor reads the code stored in the memory, to perform the method according to the first aspect.

According to a twelfth aspect, an information display device is provided. The device includes a processor and a memory, where the memory is configured to store code, and the processor reads the code stored in the memory, to perform the method according to the second aspect.

According to a thirteenth aspect, an information display device is provided. The device includes a processor and a memory, where the memory is configured to store code, and the processor reads the code stored in the memory to perform the method according to the third aspect.

According to a fourteenth aspect, an information display device is provided. The device includes a processor and a memory, where the memory is configured to store code, and the processor reads the code stored in the memory, to perform the method according to the fourth aspect.

According to a fifteenth aspect, an information display device is provided. The device includes a processor and a memory, where the memory is configured to store code, and the processor reads the code stored in the memory to perform the method according to the fifth aspect.

According to a sixteenth aspect, a computer storage medium is provided. The computer storage medium is configured to store a computer software instruction to be executed by the processor according to the eleventh aspect to perform the method according to the first aspect.

According to a seventeenth aspect, a computer storage medium is provided. The computer storage medium is configured to store a computer software instruction to be executed by the processor according to the twelfth aspect to perform the method according to the second aspect.

According to an eighteenth aspect, a computer storage medium is provided. The computer storage medium is configured to store a computer software instruction to be executed by the processor according to the thirteenth aspect to perform the method according to the third aspect.

According to a nineteenth aspect, a computer storage medium is provided. The computer storage medium is configured to store a computer software instruction to be executed by the processor according to the fourteenth aspect to perform the method according to the fourth aspect.

According to a twentieth aspect, a computer storage medium is provided. The computer storage medium is configured to store a computer software instruction to be executed by the processor according to the fifteenth aspect to perform the method according to the fifth aspect.

It may be learned from the foregoing technical solutions provided in the embodiments of the present disclosure that, in the embodiments of the present disclosure, the transmission dynamic animation is displayed such that the user more strongly perceives the connection between the terminal and the external device, thereby bringing better experience.

BRIEF DESCRIPTION OF DRAWINGS

To describe the technical solutions in some of the embodiments of the present disclosure more clearly, the following briefly describes the accompanying drawings describing some of the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure.

Figure 1:
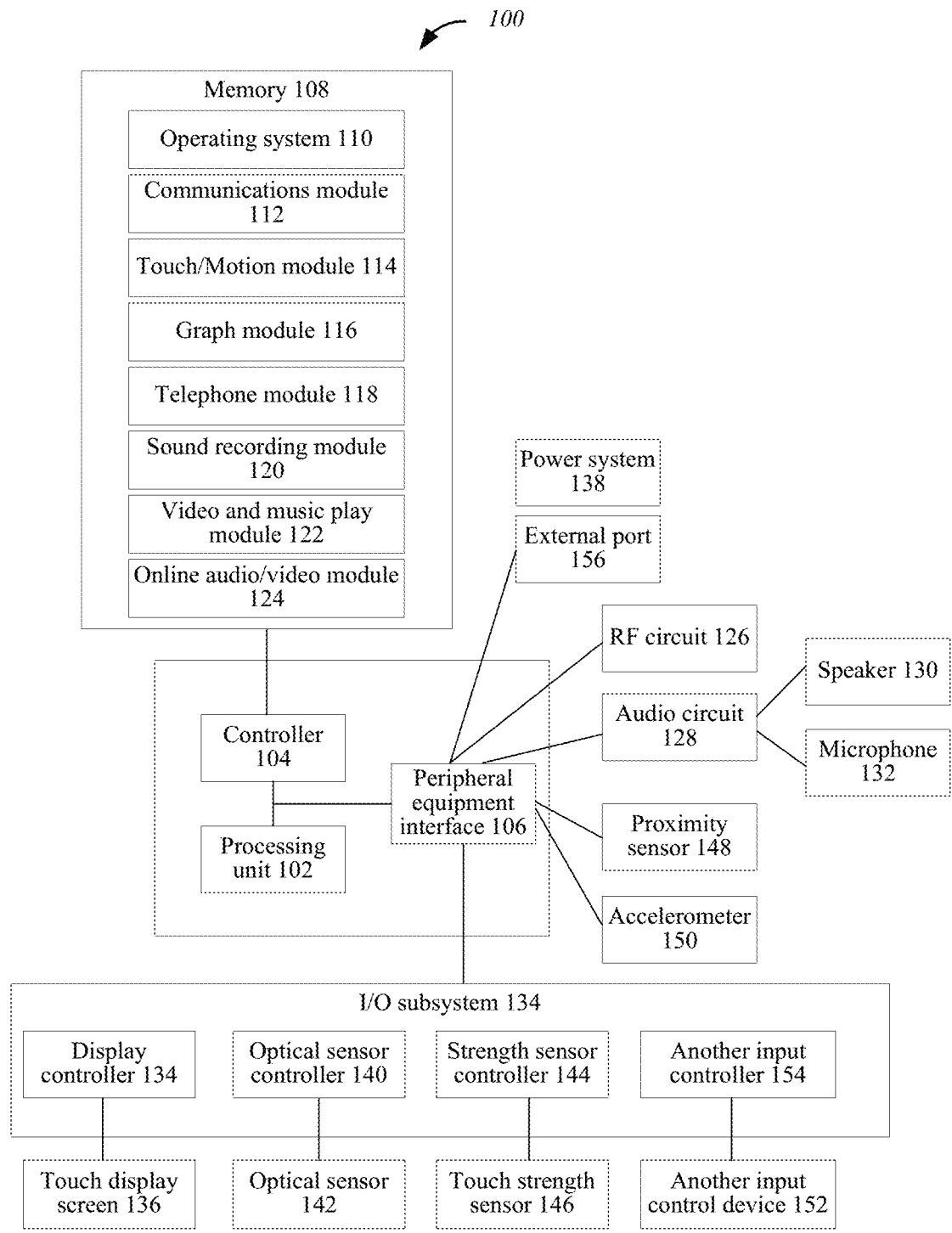
FIG. 1 is a schematic diagram of a logical structure of a computer device according to an embodiment of the present disclosure.

FIG. 1 is a schematic structural diagram of a computer device 100 according to an embodiment of the present disclosure. The computer device 100 may be a terminal, for example, but not limited to, a mobile phone, a tablet computer, a notebook computer, a smartwatch, a television set, and another electronic device having a display screen. The computer device 100 may support a plurality of application programs, for example, one or more of the following a drawing application program, a text processing application program, a website browsing application program, an electronic table application program, an office software application program, a game application program, a telephone application program, a video conferencing application program, an email application program, an instant messaging application program, a health management application program, a photo management application program, a digital camera application program, a digital video camera application program, a digital music player application program, and a digital video player application program. Each application program executed on the computer device 100 randomly obtains, using at least one hardware interface device, for example, but not limited to, a touch display screen 136, an instruction entered by a user.

The computer device 100 may include a memory 108 (the memory 108 may include one or more computer readable storage media) and one or more processing units (for example, but not limited to, at least one of a central processing unit (CPU), a graphical processing unit (GPU), a digital signal processor (DSP), and a field programmable gate array (FPGA)) 102. The computer device 100 may further include at least one of a controller 104, a peripheral equipment interface 106, a radio frequency (RF) circuit 126, an audio circuit 128, a speaker 130, a touch display screen 136, a microphone 132, an input/output (I/O) subsystem 134, another input or control device 154, and an external port 156. The computer device 100 may further include one or more optical sensors 142. The computer device 100 may further include one or more touch strength sensors 146 configured to detect touch strength on the touch display screen 136 (for example configured to detect the touch strength on the touch display screen 136, where "strength" is touch (for example, finger touch) pressure or strength on the touch display screen 136). These components communicate with each other randomly using one or more buses or signal cables. It should be understood that, the computer device 100 may also include a display screen having no user touch perception function, to replace the touch display screen 136.

It should be understood that, the computer device 100 is merely an example of a computer device, the computer device 100 may have more or fewer components than those shown in the figure, and two or more components may be randomly combined. Various components shown in FIG. 1 are implemented using hardware, software, or a combination of hardware and software, and may further include at least one of a signal processing specific integrated circuit and an application-specific integrated circuit.

The memory 108 may include a high-speed random access memory (RAM), and further include a non-volatile memory, for example, one or more magnetic disk storage devices, a flash memory device, or another non-volatile solid-state memory device. Access to the memory 108 by other components (for example, the CPU 102 and a peripheral equipment interface 106) of the computer device 100 is randomly controlled by the controller 104.

The peripheral equipment interface 106 may be configured to couple input peripheral equipment and output peripheral equipment of the computer device 100 to the processing unit 102 and the memory 108. The one or more processing units 102 run or execute various software programs and/or instruction sets stored in the memory 108 to perform various functions of the device 100 and process data. The peripheral equipment interface 106, the processing unit 102, and the controller 104 may be implemented on a single chip. Alternatively, the peripheral equipment interface 106, the processing unit 102, and the controller 104 may be implemented on independent chips.

The RF circuit 126 receives and sends RF signals that are also referred to as electromagnetic signals. The RF circuit 126 converts an electrical signal into an electromagnetic signal or converts an electromagnetic signal into an electrical signal, and communicates with a communications network and another communications device using the electromagnetic signal. The RF circuit 126 may include a circuit configured to perform the foregoing functions, and includes, but is not limited to, an antenna system, an RF transceiver, one or more amplifiers, a tuner, one or more oscillators, a digital signal processor, a codec chip set, and the like. The RF circuit 126 may communicate with a network and another device through wireless communication. The network may be, for example, the Internet, an intranet, a wireless local area network (WLAN), or a metropolitan area network (MAN). The wireless communication may include any one of a plurality of communication standards, protocols, and technologies, including, but not limited to, a Global System for Mobile Communications (GSM), an Enhanced Data GSM Environment (EDGE), High Speed Downlink Packet Access (HSDPA), High Speed Uplink Packet Access (HSUPA), Evolution-Data Only (EV-DO), HSPA, HSPA+, dual-cell HSPA (DC-HSPDA), Long Term Evolution (LTE), Near Field Communication (NFC), Wideband Code Division Multiple Access (WCDM), Code Division Multiple Access (CDMA), Time Division Multiple Access (TDMA), BLUETOOTH, WI-FI (for example, Institute of Electrical and Electronics Engineers (IEEE) 802.11a, IEEE 802. lib, IEEE 802. Ilg, or IEEE 802. Iln), Voice over Internet Protocol (VoIP), WI-MAX, an email protocol (for example, the Internet Message Access Protocol (IMAP) and/or the Post Office Protocol (POP)), instant messaging (for example, the Extensible Messaging and Presence Protocol (XMPP), the Session Initiation Protocol for Instant Messaging and Presence Leveraging Extensions (SMPLE), or an instant messaging and presence service (MPS)), or a short messaging service (SMS), and the wireless communication may further include a communication protocol that is not developed before the filing date of this document.

The audio circuit 128, the speaker 130, and the microphone 132 provide audio interfaces between the user and the device 100. The audio circuit 128 receives audio data from the peripheral equipment interface 106, converts the audio data into an electrical signal, and transmits the electrical signal to the speaker 130. The speaker 130 converts the electrical signal into an acoustic wave audible to a human ear. The audio circuit 128 further receives an electrical signal that is obtained by the microphone 132 by converting the acoustic wave. The audio circuit 128 converts the electrical signal into audio data, and transmits the audio data to the peripheral equipment interface 106 for processing. The audio data may be transmitted by the peripheral equipment interface 106 to the memory 108, the processing unit 102, or the RF circuit 126. The audio circuit 128 may further include a headset jack (for example, 212 in FIG. 2). The headset jack provides an interface between the audio circuit 128 and removable audio input/output peripheral equipment. The peripheral equipment may be a headphone having only an output, or the peripheral equipment may be a headset having both an output (for example, a single-earpiece headset or a double-earpiece headset) and an input (for example, a microphone).

An I/O subsystem 134 couples the input/output peripheral equipment, for example, the touch display screen 136 and another input control device 152, in the computer device 100 to the peripheral equipment interface 106. The I/O subsystem 134 may include a display controller 134, an optical sensor controller 140, a strength sensor controller 144, or another input controller 154 used for another input control device 116. The other input controller 154 receives an electrical signal from the other input control device 152 or sends an electrical signal to the other input control device 152. The other input control device 152 randomly includes a physical button (for example, a press button or a rocker button), a dial pad, a slider switch, a joystick, a click wheel, and the like. The other input controller 154 may also be randomly coupled to any one of a keyboard, an infrared port, a universal serial bus (USB) port, and a pointing device (for example, a mouse). The physical button (for example, a volume adjustment button 208 in FIG. 2) may further include a volume up button or a volume down button used to perform volume control on the speaker 130, a headphone, or a headset. The physical button may further include a press button (for example, a press button 206 in FIG. 2) used to turn on/off the computer device 100 and lock the computer device 100.

The touch display screen 136 provides an input interface and an output interface between the computer device 100 and the user. The display controller 134 receives an electrical signal from the touch display screen 136 or sends an electrical signal to a touchscreen 112. The touch display screen 136 displays a visual output to the user. The visual output randomly includes a graph, a text, an icon, a dynamic picture, a video, and any combination thereof.

The touch display screen 136 may have a sensor or a sensor group that receives an input from the user based on a tactile touch or a haptic touch. The touch display screen 136 and the display controller 134 (along with any associated module or instruction set in the memory 108) detect a touch on the touch display screen 136 (and any movement or interruption of the touch), and convert the detected touch into a user interface object (for example, one or more virtual buttons, icons, web pages, graphs, or images) displayed on the touch display screen 136 for an exchange. A touch point between the touch display screen 136 and the user may correspond to a finger of the user or may correspond to a stylus.

The touch display screen 136 may use liquid crystal display (LCD) technology, light emitting polymer display (LPD) technology, or light emitting diode (LED) technology. The touch display screen 136 and the display controller 134 may use any one of a plurality of known touch sensing technologies or any one of a plurality of touch sensing technologies that are to be developed in the future. The touch sensing technologies include, but are not limited to, capacitive, resistive, infrared, or surface acoustic wave touch sensing technologies. In a specific implementation process, a projective mutual-capacitance sensing technology may be used.

The touch display screen 136 may have video resolution above 100 dpi or other video resolution. The user randomly uses any suitable object or an auxiliary such as a stylus or a finger to touch the touch display screen 136. In some embodiments, a user interface may be designed to perform an exchange with the user based on a finger touch and a gesture. Because the finger has a relatively large touch area on the touch display screen 136, this may not be as accurate as an input based on the stylus. In some embodiments, the computer device 100 translates a rough input based on the finger into an accurate pointer/cursor position or a command, to perform an action expected by the user.

In some embodiments, in addition to the touchscreen, the computer device 100 may include a touchpad configured to activate or deactivate a specific function through a touch of the user. In some embodiments, an area of the touchpad and an area of the touch display screen 136 are different areas, and the two areas may be neighboring to each other, or may not be neighboring to each other. The touchpad displays no visual output.

The computer device 100 may further include a power system 138 configured to supply power to various components. The power system 138 may include a power management system, one or more power supplies (for example, a battery or an alternating current (AC)), a recharging system, a power failure detection circuit, a power converter or inverter, a power status indicator (for example, an LED), and any other component associated with power generation, management, and distribution. The power system may further include a wireless charging receiver configured to receive electric energy through wireless charging, to charge the computer device 100.

The computer device 100 may further include one or more optical sensors 142 coupled to the optical sensor controller 140 in the I/O subsystem 134. The optical sensor 142 may include a charge coupled device (CCD) or a complementary metal-oxide-semiconductor (CMOS) phototransistor. The optical sensor 142 receives, from an environment, light projected using one or more lenses, and converts the light into data indicating an image.

The computer device 100 may further include a touch strength sensor 146 coupled to the strength sensor controller 144 in the I/O subsystem 134. The touch strength sensor 146 may include one or more capacitive force sensors, electric power sensors, piezoelectric force sensors, optical force sensors, or other strength sensors. The touch strength sensor 146 is configured to receive touch strength information from an environment.

The computer device 100 may further include one or more proximity sensors 148 coupled to the peripheral equipment interface 106. In another option, the proximity sensor 148 is coupled to an input controller in the I/O subsystem 134. In some embodiments, when the computer device 100 is placed near an ear of the user (for example, when the user is making a call), the proximity sensor is turned off and the touch display screen 136 is disabled.

The computer device 100 may further include one or more accelerometers 150 coupled to the peripheral equipment interface 106. In another option, the accelerometer 150 is randomly coupled to the input controller in the I/O subsystem 134. In some embodiments, based on an analysis on data from the one or more accelerometers, a vertical view or a horizontal view is displayed on the touch display screen. In addition to the one or more accelerometers 150, the computer device 100 may include a global positioning system (GPS) (or a GLONASS or another global navigation system) receiver, to obtain location information about the device 100.

In some embodiments, the memory 108 may store an operating system 110, and at least one of the following modules a communications module (or an instruction set) 112, a touch/motion module (or an instruction set) 114, a graph module (or an instruction set) 116, a telephone module 118, a sound recording module 120, a video and music play module 122, and an online audio/video module 124. The foregoing modules are software code, and the processing unit 102 reads corresponding code in the memory 108 to implement functions of corresponding modules.

The operating system 110 (for example, DARWIN, RTXC, LINUX, UNIX, OS X, WINDOWS, an embedded operating system (for example, VXWORKS), ANDROID, IOS, WINDOWS Phone, SYMBIAN, BLACKBERRY OS, or WINDOWS Mobile) includes various software components and/or drivers configured to control and manage a general system task (for example, memory management, storage device control, or power management), and is used for communication between various hardware components and software components.

The communications module 112 is configured to communicate with another device using one or more external ports 156, and further includes various software components configured to process data received by the RF circuit 126 and/or the external port 156. The external port 156 (for example, a USB) is configured to directly connect to another device or indirectly connect to another device using a network (for example, the Internet or a WLAN). In some embodiments, the external port 156 may be a charging interface connected to the power system 138. The charging interface is configured to connect to a charging cable, to obtain external electric energy using the charging cable. Alternatively, the external port 156 may be a data interface. The data interface is configured to connect to a data cable, to obtain external data using the data cable. It should be understood that, the external port 156 may have functions of both the data interface and the charging interface, and correspondingly, the data cable and the charging cable may be a same cable.

The touch/motion module 114 may be configured to detect a touch on the touch display screen 136 (in combination with the display controller 134) and another touch device (for example, a touchpad). The touch/motion module 114 may include various software components configured to perform various operations related to touch detection, for example, determine whether there is a touch (for example, detect a finger down event), determine touch strength (for example, touch pressure or strength), determine whether there is a movement of the touch and track the movement on a surface of the touch display screen 136 (for example, detect a drag event of one or more fingers), and determine whether the touch already stops (for example, detect a finger up event or a touch interruption). The touch/motion module 114 receives touch data from the surface of the touch display screen 136. Determining a movement of a touch point may include determining a rate (a magnitude) of the touch point, a speed (a magnitude and a direction), or acceleration (a change in a magnitude and/or a direction), and the movement of the touch point is expressed as a series of touch data. These operations may be applied to a single-touch (for example, a single-finger touch) or a simultaneous touch on a plurality of points (for example, a "multi-touch"/a multi-finger touch). In some embodiments, the touch/motion module 114 and the display controller 134 detect a touch on the touchpad. In some embodiments, the touch/motion module 114 may determine, using a set including one or more strength thresholds, whether an operation is already performed by the user (for example, determine whether the user already "taps" an icon). The touch/motion module 114 may detect a gesture input of the user. Different gestures on the surface of the touch display screen 136 have different touch patterns (for example, different movements or strength of detected touches). Therefore, a gesture may be detected by detecting a specific touch pattern. For example, detecting a finger tap gesture includes detecting a finger down event, and then, detecting a finger up (lifting) event at a position the same as that of the finger down event (or a basically same position) (for example, at a position of an icon). For another example, detecting a finger swiping gesture on the surface of the touch display screen 136 includes detecting a finger down event, and then, detecting a drag event of one or more fingers, and subsequently detecting a finger up (lifting) event.

The graph module 116 may include various software components configured to present and display graphs on the touch display screen 136 or another display. The software components include a component configured to change visual impact (for example, brightness, transparency, saturation, contrast, a material, or another visual feature) of a displayed graph. In this application, the term "graph" includes any object that can be displayed to the user, for example, but not limited to, a text, a web page, an icon (for example, a user interface object including a soft key), a digital image, a video, or an animation.

In some embodiments, the graph module 116 may store data indicating a to-be-displayed graph. Corresponding code may be allocated to each graph. The graph module 116 receives one or more pieces of code of a specific to-be-displayed graph, and when necessary, may further receive coordinate data and other graph attribute data, and then generate corresponding image data to output the image data to the display controller 134, to display the image data on the touch display screen 136.

In combination with at least one of the RF circuit 126, the audio circuit 128, the speaker 130, the microphone 132, the touch display screen 136, the display controller 156, the touch/motion module 114, and the graph module 116, the telephone module 118 may be configured to make a call, answer a call, have a session, and disconnect or cut off when the session ends. As described above, the wireless communication may use any one of a plurality of communication standards, protocols, and technologies.

In combination with at least one of the audio circuit 128, the speaker 130, the microphone 132, the touch display screen 136, the display controller 156, the touch/motion module 114, and the graph module 116, the sound recording module 120 may be configured to perform sound recording, perform exchange actions, such as start, pause, continue, and complete, with the user during the sound recording, and store recorded audio data.

In combination with at least one of the touch display screen 136, the display system controller 156, the touch/motion module 114, the graph module 116, the audio circuit 128, the speaker 130, the external port 156, and the RF circuit 126, the video and music play module 122 includes an executable file allowing the user to obtain and play audio/video data stored in one or more file formats (for example, an MP3 or AAC file) and another audio/video file, and is configured to display, present, or play back, in another manner, audio/video (for example, on the touchscreen 112 or an external display connected using the external port 156). In some embodiments, the device 100 may randomly include an audio/video player. The video and music play module 122 may include a video play module and a music play module.

In combination with at least one of the touch display screen 136, the display system controller 156, the touch/motion module 114, the graph module 116, the audio circuit 128, the speaker 130, the external port 156, and the RF circuit 126, the online audio/video module 124 is configured to access, receive (for example, perform streaming transmission and/or download), play back (for example, on the touchscreen or an external display connected using the external port 124), and manage, in another manner, online audio/video data in one or more file formats (for example, H.264/H.265, Adaptive Multi-Rate Wideband (AMR-WB), or EVS). The online audio/video module 124 may include an online audio module and an online video module.

The memory 108 may further include a video conferencing module, an email client module, an instant messaging module, a camera module used for a static image or a video image, a text processing application module, an image editing module, a drawing module, a JAVA enabling module, an encryption module, a digital rights management module, a voice recognition module, or a sound reproduction module.

Each of the foregoing modules and application programs may be configured to perform a method described in this application, or may be used as a module corresponding to a method described in this application. These modules (that is, instruction sets) do not need to be implemented as independent software programs, processes, or modules. Therefore, sub groups of these modules may be randomly combined or rearranged in another manner in the embodiments. In some embodiments, the memory 108 randomly stores the sub groups of the foregoing modules. The foregoing modules and application programs in the memory may be similarly implemented using an integrated circuit or a combination of software and hardware. In addition, the memory 108 randomly stores an additional module and a data structure that are not described above.

Figure 2:
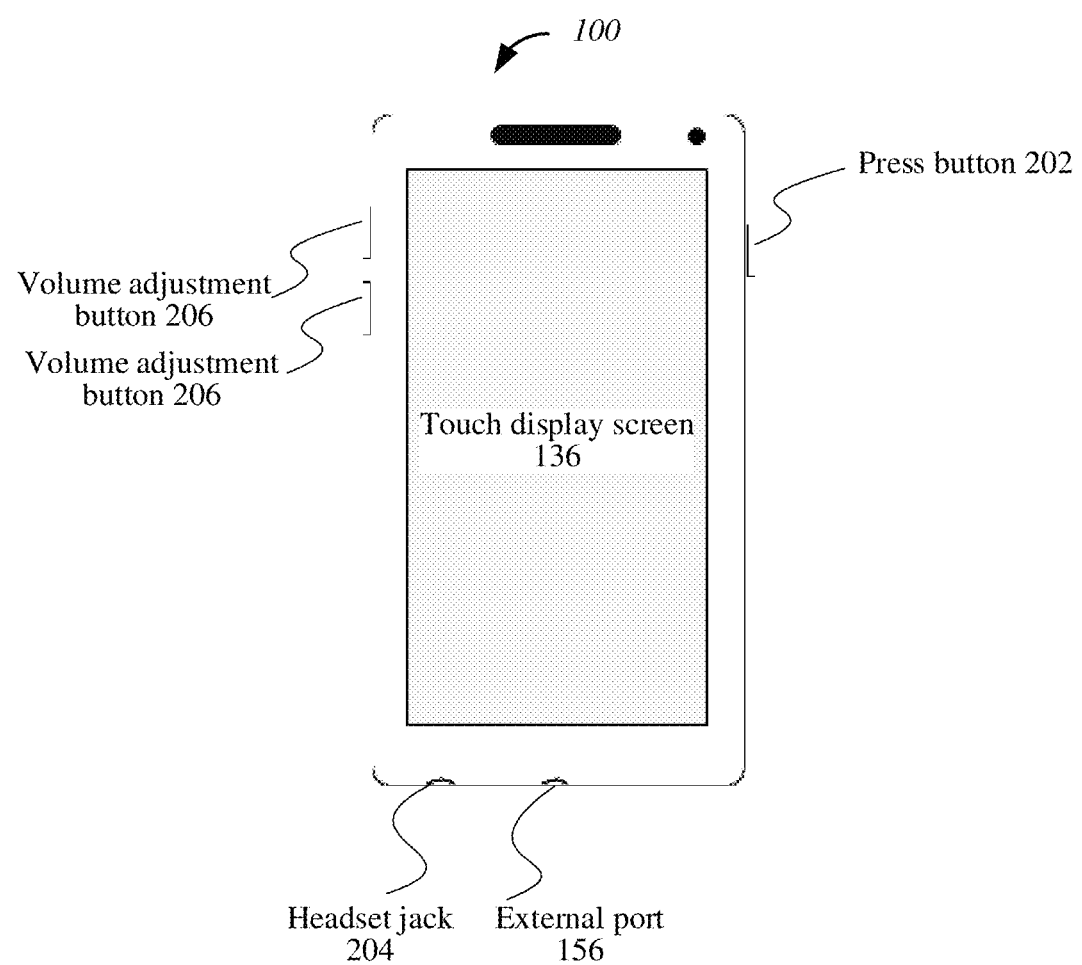
FIG. 2 is a schematic diagram of a structure of a computer device according to an embodiment of the present disclosure.

FIG. 2 is a schematic structural diagram of a computer device 100 according to an embodiment of the present disclosure. As shown in FIG. 2, the computer device may include a touch display screen 136, a press button 202 configured to turn on/off the computer device 100 and lock the computer device 100, a subscriber identity module (SIM) card slot, a headset jack 204, an external port 156, and one or two volume adjustment buttons 206 (including a volume up button and a volume down button, when there is one volume adjustment button, different positions on the volume adjustment button may be pressed to respectively implement a function of increasing a volume and a function of reducing a volume, therefore, in the present disclosure, when there is one volume adjustment button, the one volume adjustment button may also be understood as having both a volume up button and a volume down button). The touch display screen 136 may display one or more graphs. For the press button 202, the button may be pressed and the button may remain in a pressed state within a predefined time interval, to turn on/off the computer device 100, or for the press button 202, the button may be pressed and the button may be released before a predefined time interval is reached, to lock the device, and the press button 202 may be further configured to unlock the device or start an unlock process. In some embodiments, the computer device 100 may further receive an electrical signal that is obtained by the microphone 132 by converting an acoustic wave. In some embodiments, the computer device 100 may further include one or more physical buttons (or referred to as physical buttons), for example, a "home" or menu button.

Figure 3:
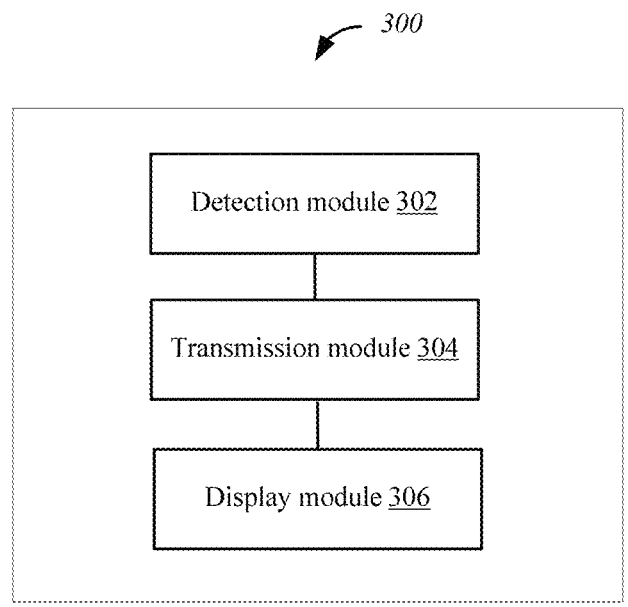
FIG. 3 is a schematic diagram of a logical structure of a terminal according to an embodiment of the present disclosure.

FIG. 3 is a schematic diagram of a logical structure of a terminal 300 according to an embodiment of the present disclosure. The terminal 300 includes a detection module 302, a transmission module 304, and a display module 306. It should be understood that, the modules in the terminal 300 may be implemented through software programming or may be implemented using a hardware circuit, or some modules may be implemented through software programming, and the other modules may be implemented using a hardware circuit. It should be understood that, the terminal 300 may be the computer device 100 in FIG. 1. Further, a screen of the terminal 300 may be the touch display screen 136.

The detection module 302 is configured to detect whether the terminal 300 is currently connected to an external device.

The transmission module 304 is configured to, when the detection module 302 detects that the terminal 300 is currently connected to the external device, transmit a transmission object between the terminal and the external device. The display module 306 is configured to, when the transmission module 304 transmits the transmission object between the terminal 300 and the external device, display a progress graph and a transmission dynamic animation on the screen of the terminal 300, where the progress graph is used to indicate a current transmission progress of the transmission object. The transmission dynamic animation includes an object graph that moves from a start position on the screen to an end position on the screen and disappears at the end position, and the object graph is used to indicate the transmission object. When a transmission direction of the transmission object is from the external device to the terminal 300, the start position may be a position on the screen that corresponds to the external device, and the end position may be a position of the progress graph, or when a transmission direction of the transmission object is from the terminal 300 to the external device, the end position may be a position on the screen that corresponds to the external device, and the start position may be a position of the progress graph. The start position may be a point, a line, or an area. The end position may be a point, a line, or an area. It should be noted that, when the transmission module 304 transmits the transmission object between the terminal 300 and the external device, the display module 306 displays the progress graph and the transmission dynamic animation on the screen of the terminal 300, and when the detection module 302 detects that the terminal 300 is currently connected to the external device, the transmission module 304 transmits the transmission object between the terminal and the external device. Therefore, in some cases (for example, when the transmission of the transmission object between the terminal 300 and the external device has same technical essence as the current connection between the terminal 300 and the external device), that when the transmission module 304 transmits the transmission object between the terminal 300 and the external device, the display module 306 displays the progress graph and the transmission dynamic animation on the screen of the terminal 300 may also be understood as that when the detection module 302 detects that the terminal 300 is currently connected to the external device, the display module 306 displays the progress graph and the transmission dynamic animation on the screen of the terminal 300.

In a specific implementation process, the display module 306 may be the graph module 116 in FIG. 1, to display the progress graph, the transmission dynamic animation, or another picture on the screen of the terminal 300. Alternatively, in a specific implementation process, the display module 306 may not be the graph module 116 in FIG. 1, and the display module 306 may determine graph data corresponding to the progress graph, the transmission dynamic animation, or another picture, and send the graph data to the screen of the terminal 300 for display.

In some embodiments, when the transmission starts, there are a relatively small quantity (for example, a quantity is less than a preset threshold, or a quantity is a preset value) of object graphs that appear at the start position in the transmission dynamic animation. During the transmission, the quantity of object graphs that appear at the start position in the transmission dynamic animation gradually increases.

In some embodiments, a graph may be displayed at the end position to identify the start position, and that the object graph in the transmission dynamic animation moves to the end position on the screen and disappears at the end position may include the object graph moves to the end position on the screen, and is fused with the graph displayed at the end position.

In some embodiments, the display module 306 may be further configured to when the transmission object is all transmitted, display a completion dynamic picture, where the completion dynamic picture may include a dynamic picture showing that a remaining object graph that is already displayed in the object graph and does not disappear moves to the end position and then disappears at the end position, or the completion dynamic picture may include a dynamic picture showing that the remaining object graph moves to the start position and then disappears at the start position.

In the completion dynamic picture, a new object graph may no longer appear at the start position.

In some embodiments, in the completion dynamic picture, transparency of the remaining object graph may gradually increase and then the remaining object graph may disappear (for example, the disappearance may be understood as that the transparency of the object graph is 100%), or in the completion dynamic picture, a color of the remaining object graph may change to a preset completion color.

In some embodiments, the display module 306 may be further configured to when the transmission of the transmission object is paused, display a pause picture showing that the remaining object graph that is already displayed in the object graph and does not disappear stops moving. Transparency of the remaining object graph in the pause picture may be greater than transparency of the object graph in the transmission dynamic animation. In the pause picture, a new object graph may no longer appear at the start position.

In the pause picture, a case in which the transparency of the remaining object graph in the pause picture may be greater than the transparency of the object graph in the transmission dynamic animation may include the transparency of the remaining object graph in the pause picture gradually increases to preset transparency.

In some embodiments, the display module 306 may be further configured to, when the transmission of the transmission object is interrupted, display a dynamic picture showing that the remaining object graph moves to the end position and then disappears at the end position. Further, in the dynamic picture, a new object graph may no longer appear at the start position.

In some embodiments, the display module 306 may be further configured to when the transmission of the transmission object is paused or interrupted, display a picture showing that the remaining object graph stops moving.

In some embodiments, the display module 306 may be further configured to when the transmission of the transmission object is resumed, display a dynamic picture showing that the remaining object graph moves to the end position and then disappears at the end position. In the dynamic picture, a new object graph may appear at the start position.

When the transmission of the transmission object is resumed, the transparency of the remaining object graph may be resumed to transparency (for example, the transparency is 0%) used before the transmission of the transmission object is paused or interrupted.

In some embodiments, the display module 306 may be further configured to display the transmission dynamic animation within preset duration. The preset duration may be 1 second to 10 seconds, for example, 3 seconds. Within the preset duration, all object graphs in the transmission dynamic animation move to the end position and then disappear at the end position.

In some embodiments, the display module 306 may be configured to display the completion dynamic picture within preset duration. The preset duration may be 1 second to 10 seconds, for example, 3 seconds.

In some embodiments, the external device may include a charging device, the transmission object may include electric energy, and that the terminal 300 is currently connected to the external device may include that the terminal 300 is currently connected to the charging device using a charging cable or through wireless charging.

That the transmission object includes electric energy may be further understood as that the transmission object includes a current or an electricity quantity.

When the terminal 300 is currently connected to the charging device using the charging cable, the charging device may be a mobile power supply, and the charging cable is electrically connected to both the mobile power supply and the terminal 300. A manner in which the charging cable is connected to the terminal 300 may be that the charging cable is plugged in a charging interface (for example, the charging interface in the embodiment corresponding to FIG. 1) to be electrically connected to the terminal 300. Alternatively, the charging device may be a power system, and the charging cable is electrically connected to both a transformer and the terminal 300. A manner in which the charging cable is connected to the terminal 300 may be that the charging cable is plugged in the charging interface (for example, the charging interface in the embodiment corresponding to FIG. 1) to be electrically connected to the terminal 300, and the transformer may be electrically connected to a socket of the power system.

When the terminal 300 is currently connected to the charging device through wireless charging, the charging device may be a wireless charger (or referred to as a wireless charging cradle). Further, a wireless charging receiver (for example, the wireless charging receiver in the embodiment corresponding to FIG. 1) of the terminal 300 may be in a wireless connection to the wireless charger.

The detection module 302 may be configured to detect whether the terminal 300 approaches the wireless charger and is in a charging status. When it is detected that the terminal 300 approaches the wireless charger and is in the charging status, it may indicate that the terminal 300 is currently connected to the charging device through wireless charging. Alternatively, the detection module 302 may be configured to detect whether the terminal 300 is in a wireless charging status. When the terminal 300 is in the wireless charging status, it may indicate that the terminal 300 is currently connected to the charging device through wireless charging.

When the terminal 300 is currently connected to the charging device using the charging cable, the start position may be on a boundary of the screen, the start position and the charging interface of the terminal 300 may be on a same side of a center of the screen, and the start position may be in a plug direction of the charging interface, and the end position may be the position of the progress graph, or when the terminal 300 is currently connected to the charging device through wireless charging, the start position may be on a boundary of the screen, and the start position may be on each of two sides of the screen, and the end position may be the position of the progress graph.

The detection module 302 may be configured to detect whether the charging cable is plugged in the charging interface of the terminal 300 and whether the terminal 300 obtains electric energy using the charging interface. When the charging cable is plugged in the charging interface of the terminal 300 and the terminal 300 obtains electric energy using the charging interface, it may indicate that the terminal 300 is currently connected to the charging device using the charging cable. The detection module 302 may be configured to detect whether the terminal 300 obtains electric energy using the wireless charging receiver. When the terminal 300 obtains electric energy using a wireless charger, it may indicate that the terminal 300 is currently connected to the charging device through wireless charging.

The transmission module 304 may be the power system 138 in FIG. 1, and is configured to, when the terminal 300 is connected to the charging device, receive electric energy transmitted by the charging device to the terminal 300.

The progress graph may be a circle, and a current radius of the progress graph may be in a positive correlation with a current electricity quantity of the terminal 300. To be specific, in the transmission dynamic animation, as the object graph continuously disappears at the position of the progress graph, a radius of the progress graph gradually increases.

Alternatively, the progress graph may be a graph of another size or a graph of a fixed area, and the current electricity quantity of the terminal 300 is indicated using a change in a value of a number or a fill effect. The current electricity quantity may be expressed as a percentage of a full charge capacity of a battery.

Figure 4:
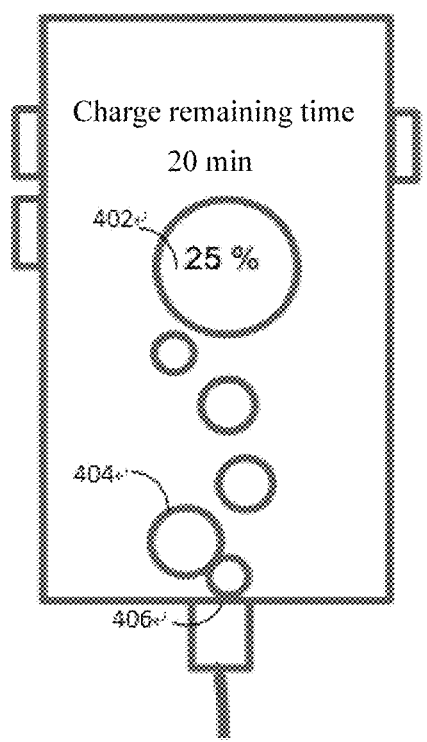
FIG. 4 is a schematic diagram of an interface of a terminal according to an embodiment of the present disclosure.

FIG. 4 is a schematic diagram of an interface of the terminal 300 when the terminal 300 is currently connected to the charging device using the charging cable, and may be used to describe the transmission dynamic animation. An object graph 404, a progress graph 402, and a start position 406 are shown in FIG. 4. In FIG. 4, the progress graph indicates that the current electricity quantity of the terminal 300 is 25%, and a remaining charging time of 20 minutes is further displayed in the interface in FIG. 4.

Figure 5:
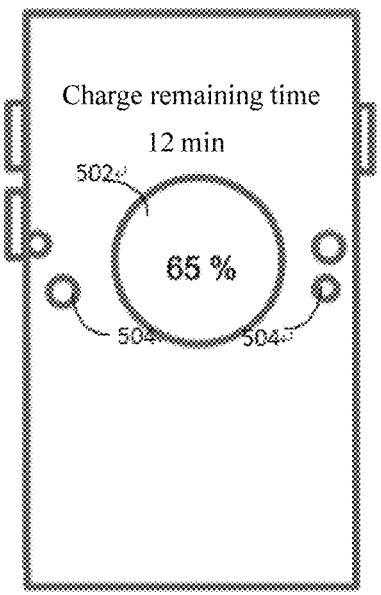
FIG. 5 is a schematic diagram of an interface of a terminal according to an embodiment of the present disclosure.

FIG. 5 is a schematic diagram of an interface of the terminal 300 when the terminal 300 is currently connected to the charging device through wireless charging, and may be used to describe the transmission dynamic animation. An object graph 504 and a progress graph 502 are shown in FIG. 5. In FIG. 5, the progress graph indicates that the current electricity quantity of the terminal 300 is 65%, and a remaining charging time of 12 minutes is further displayed in the interface in FIG. 5.

At least one of a current moving speed of the object graph and a current size of the object graph is in a positive correlation with a voltage currently provided by the charging device, or at least one of a current moving speed of the object graph and a current size of the object graph is in a positive correlation with a current that is input into the terminal.

When the current electricity quantity of the terminal 300 is less than or equal to a preset low-electricity-quantity threshold, a color of the object graph may be a preset color indicating a low electricity quantity, or when the current electricity quantity of the terminal 300 is greater than the low-electricity-quantity threshold and is less than a preset high-electricity-quantity threshold, a color of the object graph may be a preset color indicating a medium electricity quantity, or when the current electricity quantity of the terminal 300 is greater than or equal to the high-electricity-quantity threshold, a color of the object graph may be a preset color indicating a high electricity quantity.

The low-electricity-quantity threshold may be 20% (indicating 20% of the full charge capacity of the battery), and the color indicating a low electricity quantity may be red, the high-electricity-quantity threshold may be 40%, the color indicating a medium electricity quantity may be orange, and the color indicating a high electricity quantity may be green. Red, green, and orange may be further divided into different shades of red, different shades of green, and different shades of orange, to more accurately indicate the current electricity quantity.

In some embodiments, the external device may include a storage device having a communication function, the transmission object may include data information, that the terminal 300 is currently connected to the external device may include the terminal 300 is currently in a wireless connection to the storage device, and the position on the screen that corresponds to the external device may include a position of a radio signal icon on the screen.

The progress graph is used to indicate a current transmission progress of the data information of the terminal 300.

That the terminal 300 is currently in a wireless connection to the storage device may include an application download scenario, an application update scenario, or a scenario of file transmission between terminals. Correspondingly, the detection module 302 may be configured to detect a scenario that the terminal 300 is in.

The radio signal icon may be used to indicate a current manner in which the terminal 300 performs wireless communication, and the radio signal icon may be a fourth generation (4G) icon, a BLUETOOTH icon, or a WI-FI icon, respectively used to indicate 4G (or LTE) transmission, BLUETOOTH transmission, or WI-FI transmission. For the manner of the wireless communication, refer to descriptions about the RF circuit 126, and details are not described herein again.

The detection module 302 may be the communications module 112 in FIG. 1, and the detection module 302 may be configured to detect whether the RF circuit 126 receives the data information. Alternatively, the detection module may not be the communications module 112. When the communications module 112 detects that the RF circuit 126 receives the data information, the communications module 112 may notify the detection module 302, and the detection module 302 may be configured to detect whether that the communications module 112 obtains the data information is learned of. When the detection module 302 is not the communications module 112, the detection module 302 may be configured to directly detect whether the RF circuit 126 receives the data information. When the RF circuit 126 receives the data information, it may indicate that the terminal 300 is currently in a wireless connection to the storage device.

The transmission module 304 may be the communications module 112 in FIG. 1, and is configured to, when the terminal 300 is connected to the storage device, transmit the data information between the terminal 300 and the storage device.

At least one of a current moving speed of the object graph and a current size of the object graph may be in a positive correlation with a current transmission speed of the data information.

When the terminal 300 is in the application download scenario or the application update scenario, the data information may be an installation file of an application or an update file of the application, a transmission direction of the data information is from the external device to the terminal 300, the progress graph may be an icon for a download status of the application or an icon for an update status of the application, the icon for the download status is used to display a current download progress, and the icon for the update status is used to display a current update progress. The storage device may be a server.

Figure 6:
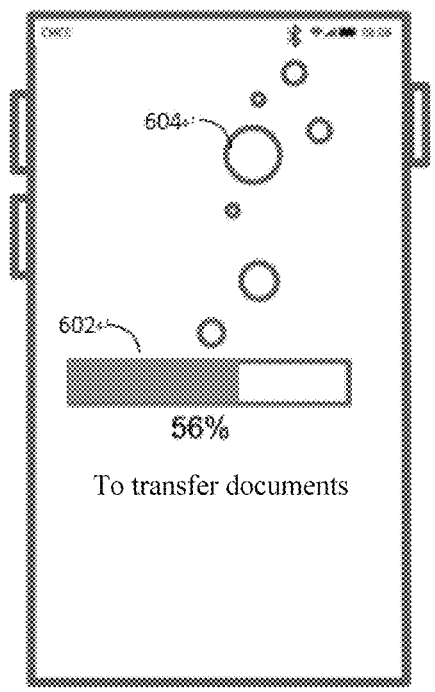
FIG. 6 is a schematic diagram of an interface of a terminal according to an embodiment of the present disclosure.

FIG. 6 is a schematic diagram of an interface of the terminal 300 in the scenario of file transmission between terminals, and may be used to describe the transmission dynamic animation. An object graph 604 and a progress graph 602 are shown in FIG. 6. In FIG. 6, the progress graph indicates the current transmission progress of transmission of the data information (for example, a file) by the terminal 300 to the storage device (for example, another terminal). It should be understood that, in a scenario in which the terminal 300 receives the file, the progress graph may be used to indicate a current process of receiving of the data information by the terminal 300 from the storage device. In FIG. 6, the progress graph 602 indicates that the current transmission progress of the transmission of the data information by the terminal to the storage device is 56%, and in FIG. 6, a wireless connection manner is a BLUETOOTH connection. Therefore, the start position in FIG. 6 is a position of a BLUETOOTH icon.

Figure 7:
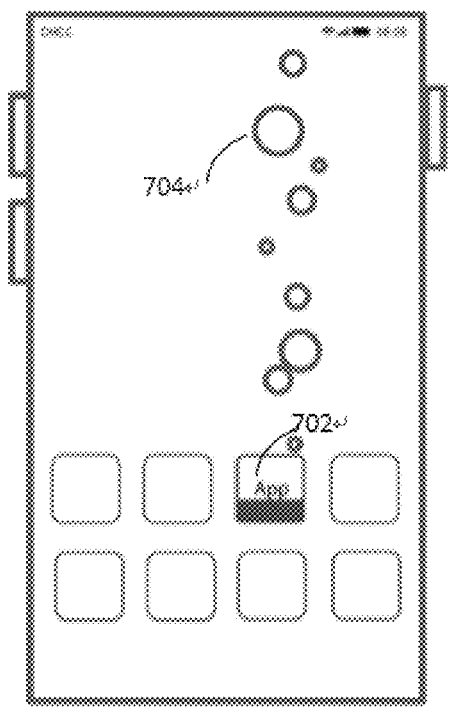
FIG. 7 is a schematic diagram of an interface of a terminal according to an embodiment of the present disclosure.

FIG. 7 is a schematic diagram of an interface of the terminal 300 when the terminal 300 is in the application download scenario or the application update scenario, and may be used to describe the transmission dynamic animation. An object graph 704 and a progress graph 702 are shown in FIG. 7. In FIG. 7, the progress graph may be the icon for the download status of the application or the icon for the update status of the application, and is used to indicate the current download or update progress. In FIG. 7, a connection manner is a WI-FI connection. Therefore, in FIG. 7, the start position is a position of a WI-FI icon.

It should be understood that, when the modules in the terminal 300 are implemented through software programming, a memory of the terminal 300 (when the terminal 300 is the computer device 100, the memory of the terminal 300 is the memory 108) may store code corresponding to the modules in the terminal 300, and data required by the modules in the terminal 300 to perform corresponding functions. Further, the memory of the terminal 300 may store a preset rule (for example, a display rule to be executed by the display module 306).

Figure 8:
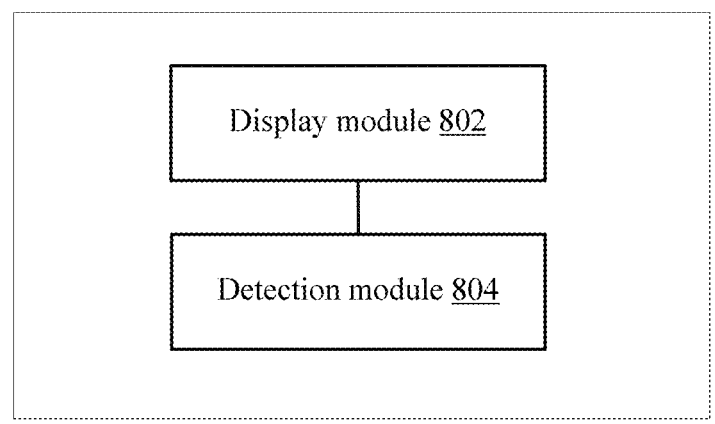
FIG. 8 is a schematic diagram of a logical structure of a terminal according to an embodiment of the present disclosure.

FIG. 8 is a schematic diagram of a logical structure of a terminal 800 according to an embodiment of the present disclosure. The terminal 800 includes a display module 802 and a detection module 804. It should be understood that, the modules in the terminal 800 may be implemented through software programming or may be implemented using a hardware circuit, or some modules may be implemented through software programming, and the other modules may be implemented using a hardware circuit. It should be understood that, the terminal 800 may be the computer device 100 in FIG. 1. Further, a screen of the terminal 800 may be the touch display screen 136.

The display module 802 may be configured to, when the terminal 800 establishes a telephone connection to another terminal, display a profile picture on the screen of the terminal 800, where the profile picture is used to indicate the other terminal.

The detection module 804 may be configured to detect whether audio data used to indicate a telephone voice of a user of the terminal 800 is received. In a specific implementation process, the detection module 804 may be the telephone module 118 in FIG. 1, and the detection module 804 may be configured to detect whether the audio data obtained by the audio circuit 128 (or the RF circuit 126) is obtained, or the detection module 804 may not be the telephone module 118, and when the telephone module 118 obtains the audio data obtained by the audio circuit 128 (or the RF circuit 126), the telephone module 118 may notify the detection module 804, and the detection module 804 may be configured to detect whether that the telephone module 118 obtains the audio data is learned of. When the detection module 804 may not be the telephone module 118, the detection module 804 may directly detect whether the audio circuit 128 (or the RF circuit 126) obtains the audio data.

The display module 802 may be further configured to when the detection module 804 detects that the terminal 800 receives the audio data, display a transmission dynamic animation on the screen, where the transmission dynamic animation may include a dynamic picture showing that an object graph appears at a start position on the screen, and the object graph moves to a position of the profile picture and then disappears at the position of the profile picture, and the object graph is used to indicate the audio data.

In some embodiments, the display module 802 may be further configured to when the detection module 804 detects that the terminal 800 currently receives no audio data of the telephone voice, display a dynamic picture showing that a remaining object graph that is already displayed in the object graph and does not disappear moves to the position of the profile picture and then disappears at the position of the profile picture. In addition, in the dynamic picture, a new object graph may no longer appear at the start position.

In a specific implementation process, the display module 802 may be the graph module 116 in FIG. 1, to display the profile picture, the transmission dynamic animation, or another picture on the screen of the terminal 800. Alternatively, in a specific implementation process, the display module 802 may not be the graph module 116 in FIG. 1, and the display module 802 may determine graph data corresponding to the profile picture, the transmission dynamic animation, or another picture, and send the graph data to the screen of the terminal 800 for display.

In some embodiments, when the audio data is from a device that has a microphone and that is in a wireless connection to the terminal 800, the start position may be a position of a radio signal icon on the screen, or when the audio data is from a device that has a microphone and that is in a wired connection to the terminal 800 using a headset jack of the terminal 800, the start position may be on a boundary of the screen, the start position and the headset jack may be on a same side of a center of the screen, and the start position may be in a plug direction of the headset jack, or when the audio data is from a microphone of the terminal 800, the start position may be on a boundary of the screen, and the start position and the microphone of the terminal 800 may be on a same side of a center of the screen. That the audio data is from the microphone of the terminal 800 may mean that the audio data is from the audio circuit 128, and the audio circuit 128 converts an electrical signal that is from the microphone 132, to obtain the audio data.

The detection module 804 may be configured to detect whether the audio data is from the RF circuit 126. When the audio data is from the RF circuit, it may indicate that the audio data is from the device that has a microphone and that is in a wireless connection to the terminal 800. The detection module 804 may be configured to detect whether the audio data is from the headset jack. When the audio data is from the headset jack, it may indicate that the audio data is from the device that has a microphone and that is in a wired connection to the terminal 800 using the headset jack of the terminal 800.

In a specific implementation process, when the device that has a microphone is connected to the terminal 800 using the headset jack, the device that has a microphone may be removable audio input/output peripheral equipment, for example, a headset, acoustic equipment, or a public play device, described in the embodiment corresponding to FIG. 1.

In some embodiments, there may be at least two object graphs.

In some embodiments, the display module 802 may be further configured to, when a call on the telephone connection is completed, display a completion dynamic picture, where the completion dynamic picture may include a dynamic picture showing that a remaining object graph that is already displayed in the object graph and does not disappear moves to the position of the profile picture and then disappears at the position of the profile picture, or the completion dynamic picture may include a dynamic picture showing that the remaining object graph moves to the start position and then disappears at the start position. In the completion dynamic picture, a new object graph may no longer appear at the start position.

In the completion dynamic picture, transparency of the remaining object graph may gradually increase and then the remaining object graph may disappear, or in the completion dynamic picture, a color of the remaining object graph may change to a preset completion color.

In some embodiments, a current moving speed of the object graph may be in a positive correlation with a current speaking speed of the telephone voice, or a current size of the object graph may be in a negative correlation with a current speaking speed of the telephone voice, and a higher current speaking speed of the telephone voice indicates a smaller current size of the object graph.

In some embodiments, when a current frequency of the telephone voice is less than or equal to a preset low-frequency threshold, a shape of the object graph may be a preset low-frequency shape, or when a current frequency of the telephone voice is greater than the low-frequency threshold and is less than a preset high-frequency threshold, a shape of the object graph may be a preset intermediate-frequency shape, or when a current frequency of the telephone voice is greater than or equal to the high-frequency threshold, a shape of the object graph may be a preset high-frequency shape. For example, the high-frequency shape may be a triangle, the intermediate-frequency shape may be a star shape, and the low-frequency shape may be a circle.

Figure 9:
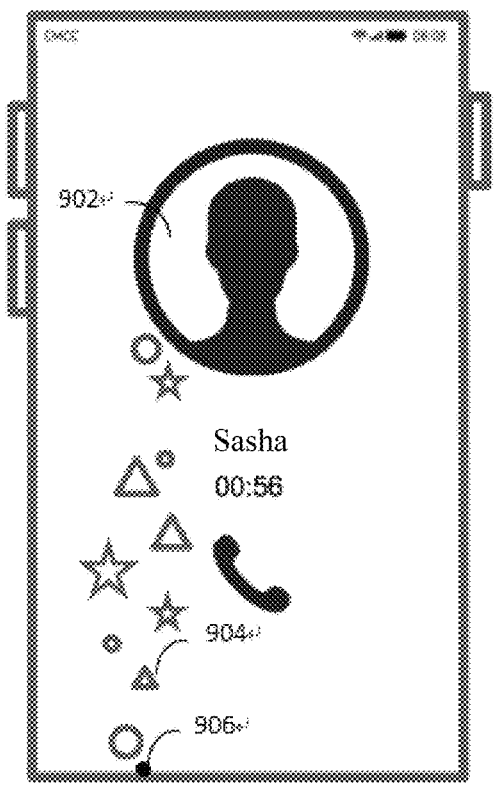
FIG. 9 is a schematic diagram of an interface of a terminal according to an embodiment of the present disclosure.

FIG. 9 is a schematic diagram of an interface of the terminal 800 when the terminal 800 establishes the telephone connection to the other terminal, and may be used to describe the transmission dynamic animation. A profile picture 902, an object graph 904, and a start position 906 are shown in FIG. 9. In FIG. 9, the terminal 800 may receive the audio data using the microphone of the terminal 800. The object graph 904 includes a circle, a star shape, and a triangle, to indicate a frequency attribute of the audio data. In FIG. 9, the microphone of the terminal 800 is below the start position 906.

It should be understood that, when the modules in the terminal 800 are implemented through software programming, a memory of the terminal 800 (when the terminal 800 is the computer device 100, the memory of the terminal 800 is the memory 108) may store code corresponding to the modules in the terminal 800, and data required by the modules in the terminal 800 to perform corresponding functions. Further, the memory of the terminal 800 may store a preset rule (for example, a display rule to be executed by the display module 802).

It should be understood that, the terminal 300 and the terminal 800 may be a same device. For same or similar technical content in the terminal 800, refer to implementation of the terminal 300, and details are not described herein again.

Figure 10:
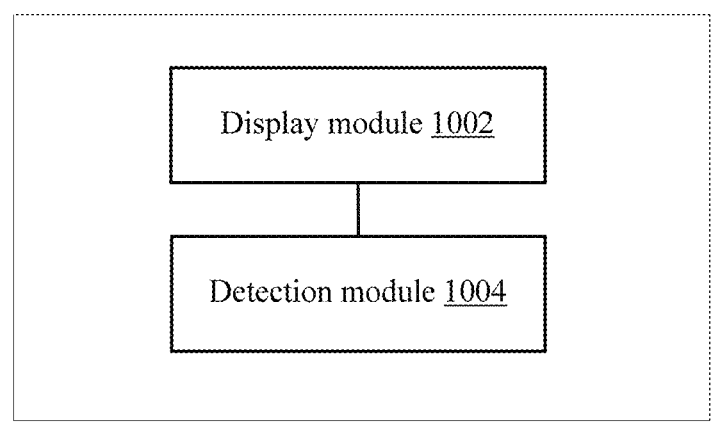
FIG. 10 is a schematic diagram of a logical structure of a terminal according to an embodiment of the present disclosure.

FIG. 10 is a schematic diagram of a logical structure of a terminal 1000 according to an embodiment of the present disclosure. The terminal 1000 includes a display module 1002 and a detection module 1004. It should be understood that, the modules in the terminal 1000 may be implemented through software programming or may be implemented using a hardware circuit, or some modules may be implemented through software programming, and the other modules may be implemented using a hardware circuit. It should be understood that, the terminal 1000 may be the computer device 100 in FIG. 1. Further, a screen of the terminal 1000 may be the touch display screen 136.

The display module 1002 may be configured to, when music corresponding to audio data is played, display a disc graph on the screen of the terminal 1000, where the disc graph is used to indicate the music. In a specific implementation process, when starting to play the music, the video and music play module 122 (or the music play module in the video and music play module) may instruct the display module 1002 to display the disc graph. Alternatively, in a specific implementation process, when starting to play the music, the online audio/video module 124 (the online audio module in the online audio/video module 124) may instruct the display module 1002 to display the disc graph. Alternatively, in a specific implementation process, when reading code in the memory 108 to play the music, the processing unit 102 may instruct the display module 1002 to display the disc graph, or when the display module 1002 is implemented using software code, the processing unit 102 plays the music and displays a play graph using code (including code corresponding to the display module 1002) in the memory 108.

Before the music corresponding to the audio data is played, the video and music play module 122 (or the online audio/video module 124 or the processing unit 102) may first perform decoding to obtain the audio data.

The detection module 1004 may be configured to detect whether the terminal 1000 currently outputs the audio data to a playback device. In a specific implementation process, the detection module 1004 may be the video and music play module 122 (or the music play module in the video and music play module) or the online audio/video module 124 (the online audio module in the online audio/video module 124) in FIG. 1, and the detection module 1004 may detect whether the audio circuit 128 (or the RF circuit) outputs the audio data to the playback device. The detection module 1004 may not be the video and music play module 122 (or the music play module in the video and music play module), and may not be the online audio/video module 124 (the online audio module in the online audio/video module 124). When the video and music play module 122 (or the music play module in the video and music play module) or the online audio/video module 124 (the online audio module in the online audio/video module 124) outputs the audio data to the playback device, the video and music play module 122 (or the music play module in the video and music play module) or the online audio/video module 124 (the online audio module in the online audio/video module 124) may notify the detection module 1004, and the detection module may be configured to detect whether that the video and music play module 122 (the music play module in the video and music play module) or the online audio/video module 124 (the online audio module in the online audio/video module 124) outputs the audio data to the playback device using the audio circuit 128 (or the RF circuit 126) is learned of. Alternatively, when the detection module 1004 is not the video and music play module 122 (or the music play module in the video and music play module), and is not the online audio/video module 124 (the online audio module in the online audio/video module 124), the detection module 1004 may directly detect whether the audio circuit 128 (or the RF circuit 126) outputs the audio data to the playback device.

The display module 1002 may be further configured to, when the detection module 1004 detects that the terminal 1000 currently outputs the audio data to the playback device, display a transmission dynamic animation on the screen, where the transmission dynamic animation is a dynamic picture showing that an object graph appears at a position of the disc graph on the screen, and the object graph moves to an end position and then disappears at the end position, and the object graph is used to indicate the audio data.

In some embodiments, the display module 1002 may not be configured to display the disc graph, and when the detection module 1004 detects that the terminal 1000 currently outputs the audio data to the playback device, display, on the screen, a dynamic picture showing that the object graph appears at a start position, and the object graph moves to the end position and then disappears at the end position. The object graph is used to indicate the audio data. The start position may be a point, a line, or an area. The start position may be preset.

In a specific implementation process, the display module 1002 may be the graph module 116 in FIG. 1, to display the disc graph, the transmission dynamic animation, or another picture on the screen of the terminal 1000. Alternatively, in a specific implementation process, the display module 1002 may not be the graph module 116 in FIG. 1, and the display module 1002 may determine graph data corresponding to the disc graph, the transmission dynamic animation, or another picture, and send the graph data to the screen of the terminal 1000 for display.

In some embodiments, when the terminal 1000 is in a wireless connection to the playback device, and the terminal 1000 currently outputs the audio data to the playback device, the end position may be a position of a radio signal icon on the screen, or when the terminal 1000 is in a wired connection to the playback device using a headset jack, and the terminal 1000 currently outputs the audio data to the playback device, the end position may be on a boundary of the screen of the terminal 1000, the end position and the headset jack are on a same side of a center of the screen, and the end position is in a plug direction of the headset jack.

For example, when the terminal 1000 outputs the audio data to the playback device through BLUETOOTH, the end position may be a position of a BLUETOOTH icon. When the terminal 1000 outputs the audio data to the playback device through WI-FI, the end position may be a position of a WI-FI icon.

In a specific implementation process, the detection module 1004 may be configured to, when the music corresponding to the audio data is played, detect whether a data cable is plugged in the headset jack. When the data cable is plugged in the headset jack, it may indicate that the terminal 1000 is in a wired connection to the playback device using the headset jack, and the terminal 1000 currently outputs the audio data to the playback device. Alternatively, when the music corresponding to the audio data is played, the detection module 1004 may detect whether a data cable is plugged in the headset jack and detect whether the terminal 1000 currently outputs the audio data to the playback device using the headset jack. When the data cable is plugged in the headset jack, and the terminal 1000 currently outputs the audio data to the playback device using the headset jack, it may indicate that the terminal 1000 is in a wired connection to the playback device using the headset jack, and the terminal 1000 currently outputs the audio data to the playback device.

In a specific implementation process, when an operating system included in the memory of the terminal 1000 is ANDROID, the detection module 1004 may be configured to detect whether an event type included in an intent broadcast message indicates that the data cable is plugged in the headset jack (for example, whether the event type is (android.intent.action.HEADSET_PLUG) to detect whether the data cable is plugged in the headset jack.

In some embodiments, the display module 1002 may be configured to display the transmission dynamic animation within preset duration. The preset duration may be 1 second to 10 seconds, for example, 3 seconds. Within the preset duration, all object graphs in the transmission dynamic animation move to the end position and then disappear at the end position.

In some embodiments, when a current frequency of the music is less than or equal to a preset low-frequency threshold, a shape of the object graph may be a preset low-frequency shape, or when a current frequency of the music is greater than the low-frequency threshold and is less than a preset high-frequency threshold, a shape of the object graph may be a preset intermediate-frequency shape, or when a current frequency of the music is greater than or equal to the high-frequency threshold, a shape of the object graph may be a preset high-frequency shape.

In some embodiments, a current moving speed of the object graph may be in a positive correlation with a current rhythm of the music, or a current size of the object graph may be in a negative correlation with a current rhythm of the music, and a faster current rhythm of the music indicates a smaller current size of the object graph.

In some embodiments, in the transmission dynamic animation, a quantity of object graphs that appear per second is in a positive correlation with resolution of the audio data.

In some embodiments, the display module 1002 may be further configured to, when the terminal 1000 currently does not output the audio data to the playback device, display a silent dynamic picture, where the silent dynamic picture is a dynamic picture showing that a remaining object graph that is already displayed in the object graph and does not disappear moves to the end position and then disappears at the end position.

In the silent dynamic picture, a new object graph may no longer appear at the position of the disc graph.

In some embodiments, the display module 1002 may be further configured to, when the music is paused, display a pause picture showing that the remaining object graph that is already displayed in the object graph and does not disappear stops moving. Transparency of the remaining object graph in the pause picture may be greater than transparency of the object graph in the transmission dynamic animation. In the pause picture, a new object graph may no longer appear at the position of the disc graph.

In the pause picture, a case in which the transparency of the remaining object graph in the pause picture is greater than the transparency of the object graph in the transmission dynamic animation may include the transparency of the remaining object graph gradually increases to preset transparency.

In some embodiments, the display module 1002 may be further configured to, when the play of the music is resumed, display a dynamic picture showing that the remaining object graph moves to the end position and then disappears at the end position. In the dynamic picture, a new object graph may appear at the position of the disc graph. Further, the transparency of the remaining object graph may be resumed to transparency used before the transmission of the transmission object is paused or interrupted.

Figure 11:
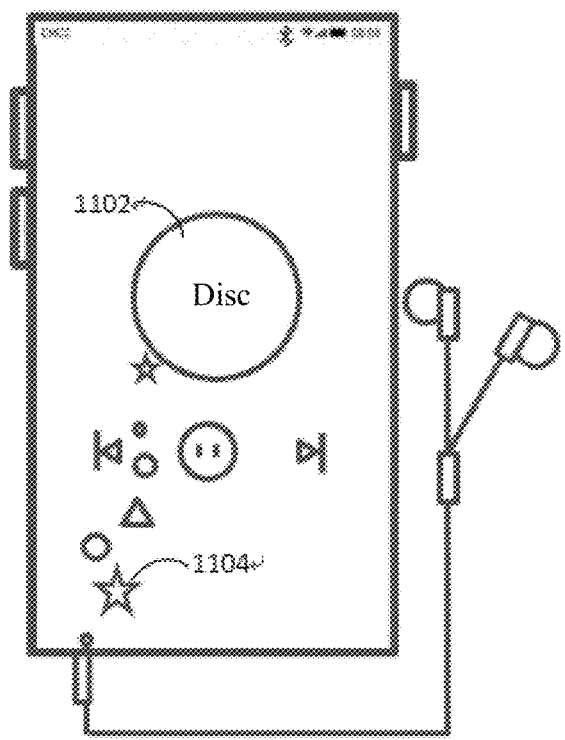
FIG. 11 is a schematic diagram of an interface of a terminal according to an embodiment of the present disclosure.

FIG. 11 is a schematic diagram of an interface of the terminal 1000 when the terminal 1000 plays the music corresponding to the audio data, and may be used to describe the transmission dynamic animation. A disc graph 1102 and an object graph 1104 are shown in FIG. 11. In FIG. 11, the terminal 1000 receives the audio data using the headset jack of the terminal 1000. The object graph 1104 includes a circle, a star shape, and a triangle, to indicate a frequency attribute of the audio data. In FIG. 11, the headset jack of the terminal 1000 is below the start position.

It should be understood that, when the modules in the terminal 1000 are implemented through software programming, a memory of the terminal 1000 (when the terminal 1000 is the computer device 100, the memory of the terminal 1000 is the memory 108) may store code corresponding to the modules in the terminal 1000, and data required by the modules in the terminal 1000 to perform corresponding functions. Further, the memory of the terminal 1000 may store a preset rule (for example, a display rule to be executed by the display module 1002).

It should be understood that, at least two of the terminal 300, the terminal 800, and the terminal 1000 may be a same device. For same or similar technical content in the terminal 1000, refer to implementation of the terminal 300 or the terminal 800, and details are not described herein again.

Figure 12:
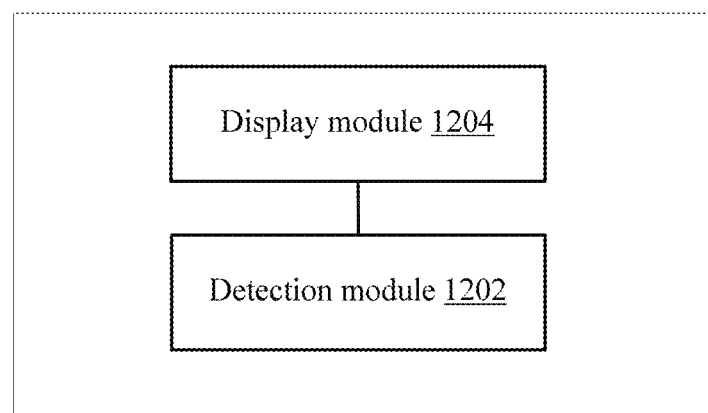
FIG. 12 is a schematic diagram of a logical structure of a terminal according to an embodiment of the present disclosure.

FIG. 12 is a schematic diagram of a logical structure of a terminal 1200 according to an embodiment of the present disclosure. The terminal 1200 includes a detection module 1202 and a display module 1204. It should be understood that, the modules in the terminal 1200 may be implemented through software programming or may be implemented using a hardware circuit, or some modules may be implemented through software programming, and the other modules may be implemented using a hardware circuit. It should be understood that, the terminal 1200 may be the computer device 100 in FIG. 1. Further, a screen of the terminal 1200 may be the touch display screen 136.

The detection module 1202 may be configured to detect whether a volume up button of the terminal 1200 is pressed, where the volume up button is used by a user to increase a volume of the terminal 1200.

The display module 1204 may be configured to, when the detection module 1202 detects that the volume up button is pressed, display a volume up dynamic picture on the screen of the terminal 1200, where the volume up dynamic picture is a dynamic picture showing that a volume up object graph appears at a start position on the screen, and the volume up object graph moves to a volume position on the screen and then disappears at the volume position, and the volume up object graph is used to indicate an instruction for increasing the volume.

The volume position may be preset.

The display module 1204 may be further configured to display a volume graph on the screen of the terminal 1200, where the volume graph is used to indicate a current volume value of the terminal 1200, and the volume position is a position of the volume graph.

The display module 1204 may be further configured to obtain the current volume value of the terminal 1200.

The display module 1204 may be further configured to obtain the start position and the volume position. The start position and the volume position may be preset. Further, the display module 1204 may be further configured to obtain, based on a preset correspondence, the start position and the volume position that correspond to an event type (or an event identifier) of an event used to indicate that the volume up button is pressed.

In a specific implementation process, the display module 1204 may be the graph module 116 in FIG. 1, to display the volume graph, the volume up dynamic picture, or another picture on the screen of the terminal 1200. Alternatively, in a specific implementation process, the display module 1204 may not be the graph module 116 in FIG. 1, and the display module 1204 may determine graph data corresponding to the volume graph, the volume up dynamic picture, or another picture, and send the graph data to the screen of the terminal 1200 for display.

In some embodiments, the start position is on a boundary of the screen of the terminal 1200, the start position and the volume up button of the terminal 1200 are on a same side of a center of the screen, and the start position is in a press direction of the volume up button.

In some embodiments, the detection module 1202 may be further configured to detect whether a volume down button of the terminal 1200 is pressed, where the volume up button is used by the user to reduce the volume of the terminal 1200. Correspondingly, the display module 1204 may be further configured to when the detection module 1202 detects that the volume down button is pressed, display a volume down dynamic picture on the screen, where the volume down dynamic picture is a dynamic picture showing that a volume down object graph appears at the volume position, and the volume down object graph moves to an end position on the screen of the terminal 1200 and then disappears at the end position, and the volume down object graph is used to indicate an instruction for reducing the volume.

The display module 1204 may be further configured to obtain the end position. The end position may be preset. Further, the display module 1204 may be further configured to obtain, based on a preset correspondence, the end position and the volume position (if the volume position is already obtained, the volume position may not be obtained) that correspond to an event type (or an event identifier) of an event used to indicate that the volume down button is pressed.

The end position may be on a boundary of the screen of the terminal 1200, the end position and the volume down button of the terminal 1200 may be on a same side of the center of the screen, and the end position may be in a press direction of the volume down button.

When the volume down button is pressed once, a quantity of volume down object graphs that appear at the position of the volume graph in the volume down dynamic picture is a preset quantity.

In some embodiments, the volume graph may be a circle, and a current radius of the volume graph may be in a positive correlation with the current volume of the terminal 1200. When the current volume of the terminal 1200 is a minimum volume of the terminal, the minimum volume indicates muteness. The volume graph may include a symbol indicating muteness.

In some embodiments, when the volume up button is pressed once, a quantity of volume up object graphs that appear at the start position in the volume up dynamic picture is a preset quantity.

Figure 13A:
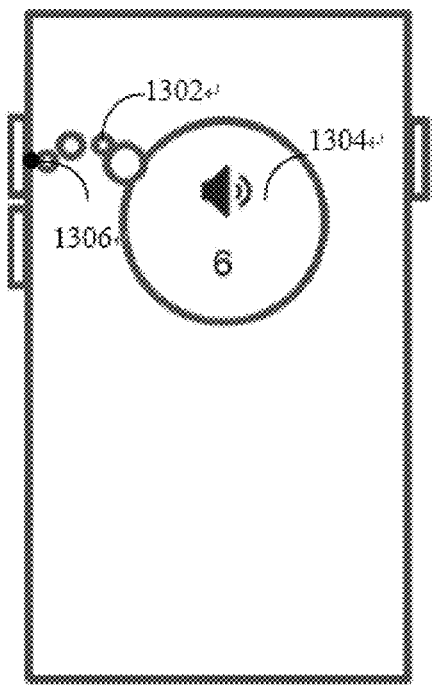
FIG. 13A is a schematic diagram of an interface of a terminal according to an embodiment of the present disclosure.

FIG. 13A is a schematic diagram of an interface of the terminal 1200 when the terminal 1200 detects that the volume up button is pressed, and may be used to describe the volume up dynamic picture. A volume graph 1304, a volume up object graph 1302, and a start position 1306 are shown in FIG. 13A. In FIG. 13A, the current volume indicated by the volume graph is 6, and the start position 1306 is near the volume up button.

Figure 13B:
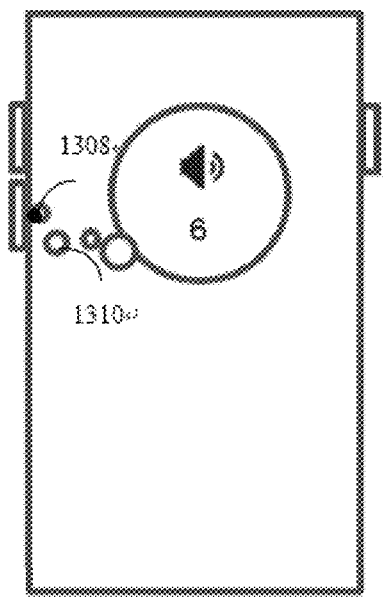
FIG. 13B is a schematic diagram of an interface of a terminal according to an embodiment of the present disclosure.

FIG. 13B is a schematic diagram of an interface of the terminal 1200 when the terminal 1200 detects that the volume down button is pressed, and may be used to describe the volume down dynamic picture. A volume down object graph 1310 and an end position 1308 are shown in FIG. 13B. In FIG. 13B, the end position 1308 is near the volume down button.

It should be understood that, when the modules in the terminal 1200 are implemented through software programming, a memory of the terminal 1200 (when the terminal 1200 is the computer device 100, the memory of the terminal 1200 is the memory 108) may store code corresponding to the modules in the terminal 1200, and data required by the modules in the terminal 1200 to perform corresponding functions. Further, the memory of the terminal 1200 may store a preset rule (for example, a display rule to be executed by the display module 1204).

It should be understood that, at least two of the terminal 300, the terminal 800, the terminal 1000, and the terminal 1200 may be a same device. For same or similar technical content in the terminal 1200, refer to implementation of the terminal 300, the terminal 800, or the terminal 1000, and details are not described herein again.

Figure 14:
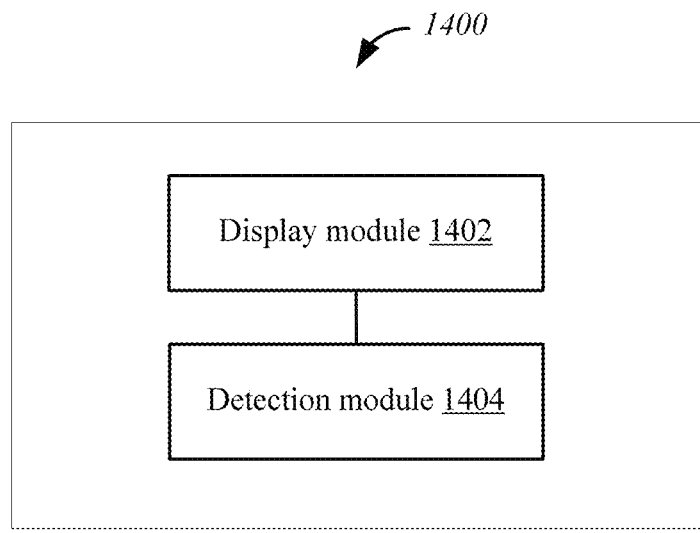
FIG. 14 is a schematic diagram of a logical structure of a terminal according to an embodiment of the present disclosure.

FIG. 14 is a schematic diagram of a logical structure of a terminal 1400 according to an embodiment of the present disclosure. The terminal 1400 includes a display module 1402 and a detection module 1404. It should be understood that, the modules in the terminal 1400 may be implemented through software programming or may be implemented using a hardware circuit, or some modules may be implemented through software programming, and the other modules may be implemented using a hardware circuit. It should be understood that, the terminal 1400 may be the computer device 100 in FIG. 1. Further, a screen of the terminal 1400 may be the touch display screen 136.

The display module 1402 may be configured to display a sound recording graph on the screen of the terminal 1400, where the sound recording graph is used to indicate that a sound recording interface is opened.

The detection module 1404 may be configured to detect whether the terminal 1400 receives audio data used to indicate a voice of a user of the terminal 1400. In a specific implementation process, the detection module 1404 may be the sound recording module 120 in FIG. 1, and the detection module 1404 may be configured to detect whether the audio data obtained by the audio circuit 128 (or the RF circuit 126) is obtained, or the detection module 1404 may not be the sound recording module 120, and when the sound recording module 120 obtains the audio data obtained by the audio circuit 128 (or the RF circuit 126), the sound recording module 120 notifies the detection module 1404, and the detection module 1404 may be configured to detect whether that the sound recording module 120 obtains the audio data is learned of. When the detection module 1404 may not be the sound recording module 120, the detection module 1404 may directly detect whether the audio circuit 128 (or the RF circuit 126) obtains the audio data. The detection module 1404 may be configured to, after detecting that the user enables a sound recording function, detect whether the terminal 1400 receives the audio data used to indicate the voice of the user of the terminal 1400.

The display module 1402 may be further configured to, when the detection module 1404 detects that the terminal 1400 receives the audio data, display a transmission dynamic animation on the screen, where the transmission dynamic animation is a dynamic picture showing that an object graph appears at a start position on the screen, and the object graph moves to the sound recording graph and then disappears at a position of the sound recording graph, and the object graph is used to indicate the audio data.

In a specific implementation process, the display module 1402 may be the graph module 116 in FIG. 1 to display the sound recording graph, the transmission dynamic animation, or another picture on the screen of the terminal 1400. Alternatively, in a specific implementation process, the display module 1402 may not be the graph module 116 in FIG. 1, and the display module 1402 may determine graph data corresponding to the sound recording graph, the transmission dynamic animation, or another picture, and send the graph data to the screen of the terminal 1400 for display.

In some embodiments, when the audio data is from a device that has a microphone and that is in a wireless connection to the terminal 1400, the start position may be a position of a radio signal icon on the screen, or when the audio data is from a device that has a microphone and that is in a wired connection to the terminal 1400 using a headset jack of the terminal 1400, the start position may be on a boundary of the screen, the start position and the headset jack of the terminal 1400 may be on a same side of a center of the screen, and the start position may be in a plug direction of the headset jack, or when the audio data is from a microphone of the terminal 1400, the start position is on a boundary of the screen of the terminal 1400, and the start position and the microphone of the terminal 1400 may be on a same side of a center of the screen.

The microphone of the terminal 1400 may include at least two microphones, and when the audio data is from any one of the at least two microphones, the start position and the any one of the microphones may be on a same side of the center of the screen. Correspondingly, the detection module 1404 may be configured to detect that the audio data is from which of the at least two microphones.

In some embodiments, there may be at least two object graphs.

In some embodiments, the display module 1402 may be further configured to, when the sound recording function is completed or when the sound recording function is paused, display a completion dynamic picture, where the completion dynamic picture is a dynamic picture showing that a remaining object graph that is already displayed in the object graph and does not disappear moves to the position of the sound recording graph and then disappears at the position of the sound recording graph, or the completion dynamic picture is a dynamic picture showing that the remaining object graph moves to the start position and then disappears at the start position. In the completion dynamic picture, a new object graph may no longer appear at the start position.

In some embodiments, the display module 1402 may be further configured to when the terminal 1400 fails in audio reception, display the completion dynamic picture.

In some embodiments, a current moving speed of the object graph may be in a positive correlation with a current speaking speed of the voice, or a current size of the object graph may be in a negative correlation with a current speaking speed of the voice, and a higher current speaking speed of the voice indicates a smaller current size of the object graph.

In some embodiments, when a current frequency of the voice is less than or equal to a preset low-frequency threshold, a shape of the object graph may be a preset low-frequency shape, or when a current frequency of the voice is greater than the low-frequency threshold and is less than a preset high-frequency threshold, a shape of the object graph may be a preset intermediate-frequency shape, or when a current frequency of the voice is greater than or equal to the high-frequency threshold, a shape of the object graph may be a preset high-frequency shape.

It should be understood that, when the modules in the terminal 1400 are implemented through software programming, a memory of the terminal 1400 (when the terminal 1400 is the computer device 100, the memory of the terminal 1400 is the memory 108) may store code corresponding to the modules in the terminal 1400, and data required by the modules in the terminal 1400 to perform corresponding functions. Further, the memory of the terminal 1400 may store a preset rule (for example, a display rule to be executed by the display module 1402).

Figure 15:
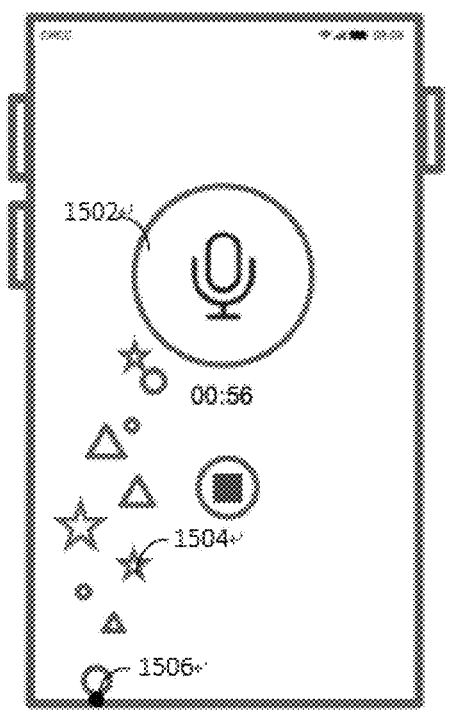
FIG. 15 is a schematic diagram of an interface of a terminal according to an embodiment of the present disclosure.

FIG. 15 is a schematic diagram of an interface of the terminal 1400 when the terminal 1400 performs sound recording, and may be used to describe the transmission dynamic animation. A sound recording graph 1502, an object graph 1504, and a start position 1506 are shown in FIG. 15. In FIG. 15, the terminal 1400 may receive the audio data using the microphone of the terminal 1400. The object graph 1504 includes a circle, a star shape, and a triangle, to indicate a frequency attribute of the audio data. In FIG. 15, the microphone of the terminal 1400 is below the start position 1506.

It should be understood that, at least two of the terminal 300, the terminal 800, the terminal 1000, the terminal 1200, and the terminal 1400 may be a same device. For same or similar technical content in the terminal 1400, refer to implementation of the terminal 300, the terminal 800, the terminal 1000, or the terminal 1200, and details are not described herein again.

Figure 16:
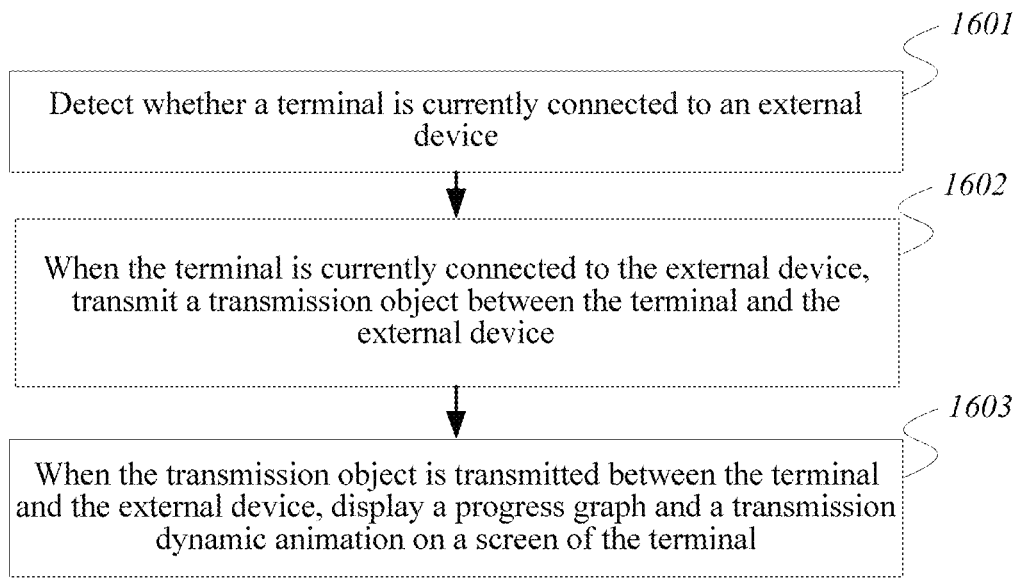
FIG. 16 is a schematic flowchart of an information display method according to an embodiment of the present disclosure.

FIG. 16 is a schematic flowchart of an information display method. The method may be performed by the terminal 300, and steps of the method are as follows.

Step 1601: Detect whether the terminal is currently connected to an external device.

Step 1602: When the terminal is currently connected to the external device, transmit a transmission object between the terminal and the external device.

Step 1603: When the transmission object is transmitted between the terminal and the external device, display a progress graph and a transmission dynamic animation on a screen of the terminal, where the progress graph is used to indicate a current transmission progress of the transmission object, the transmission dynamic animation includes an object graph that moves from a start position on the screen to an end position on the screen and disappears at the end position, and the object graph is used to indicate the transmission object. When a transmission direction of the transmission object is from the external device to the terminal, the start position may be a preset position on the screen that corresponds to the external device, and the end position may be a position of the progress graph, or when a transmission direction of the transmission object is from the terminal to the external device, the end position may be a position on the screen that corresponds to the external device, and the start position may be a position of the progress graph.

In some embodiments, there may be at least two object graphs.

In some embodiments, the method may further include when the transmission object is all transmitted, displaying a completion dynamic picture, where the completion dynamic picture may include a dynamic picture showing that a remaining object graph that is already displayed in the object graph and does not disappear moves to the end position and then disappears at the end position, or the completion dynamic picture may include a dynamic picture showing that the remaining object graph moves to the start position and then disappears at the start position. In the completion dynamic picture, a new object graph may no longer appear at the start position.

In the completion dynamic picture, transparency of the remaining object graph may gradually increase and then the remaining object graph may disappear, or in the completion dynamic picture, a color of the remaining object graph may change to a preset completion color.

In some embodiments, the method may further include, when the transmission of the transmission object is paused, displaying a pause picture showing that the remaining object graph that is already displayed in the object graph and does not disappear stops moving. Transparency of the remaining object graph in the pause picture may be greater than transparency of the object graph in the transmission dynamic animation. In the pause picture, a new object graph may no longer appear at the start position.

In some embodiments, the method may further include, when the transmission of the transmission object is resumed, displaying a dynamic picture showing that the remaining object graph moves to the end position and then disappears at the end position. In the dynamic picture, a new object graph may appear at the start position.

In some embodiments, the displaying a transmission dynamic animation may include displaying the transmission dynamic animation within preset duration.

In some embodiments, the displaying a completion dynamic picture may include displaying the completion dynamic picture within preset duration.

In some embodiments, the external device may include a charging device, the transmission object may include electric energy, and that the terminal is currently connected to the external device may include that the terminal is currently connected to the charging device using a charging cable or through wireless charging. When the terminal is currently connected to the charging device using the charging cable, the start position may be on a boundary of the screen, the start position and a charging interface of the terminal may be on a same side of a center of the screen, and the start position may be in a plug direction of the charging interface, and the end position may be the position of the progress graph, or when the terminal is currently connected to the charging device through wireless charging, the start position may be on a boundary of the screen, and the start position may be on each of two sides of the screen (it means that there are start positions on both sides), and the end position may be the position of the progress graph.

The progress graph may be a circle, and a current radius of the progress graph may be in a positive correlation with a current electricity quantity of the terminal.

At least one of a current moving speed of the object graph and a current size of the object graph may be in a positive correlation with a voltage currently provided by the charging device, or at least one of a current moving speed of the object graph and a current size of the object graph may be in a positive correlation with a current that is input into the terminal.

When the current electricity quantity of the terminal is less than or equal to a preset low-electricity-quantity threshold, a color of the object graph may be a preset color indicating a low electricity quantity, or when the current electricity quantity of the terminal is greater than the low-electricity-quantity threshold and is less than a preset high-electricity-quantity threshold, a color of the object graph may be a preset color indicating a medium electricity quantity, or when the current electricity quantity of the terminal is greater than or equal to the high-electricity-quantity threshold, a color of the object graph may be a preset color indicating a high electricity quantity.

In some embodiments, the external device may include a storage device having a communication function, the transmission object may include data information, that the terminal is currently connected to the external device may include the terminal is currently in a wireless connection to the storage device, and the position on the screen that corresponds to the external device may include a position of a radio signal icon on the screen.

At least one of a current moving speed of the object graph and a current size of the object graph may be in a positive correlation with a current transmission speed of the data information.

The data information is an installation file of an application or an update file of the application, a transmission direction of the data information is from the external device to the terminal, the progress graph is an icon for a download status of the application or an icon for an update status of the application, the icon for the download status is used to display a current download progress, and the icon for the update status is used to display a current update progress.

The method embodiment of the present disclosure is based on a same conception as the apparatus embodiment. For specific content, refer to descriptions of operations performed by corresponding components in the apparatus embodiment of the present disclosure, and details are not described herein again.

Figure 17:
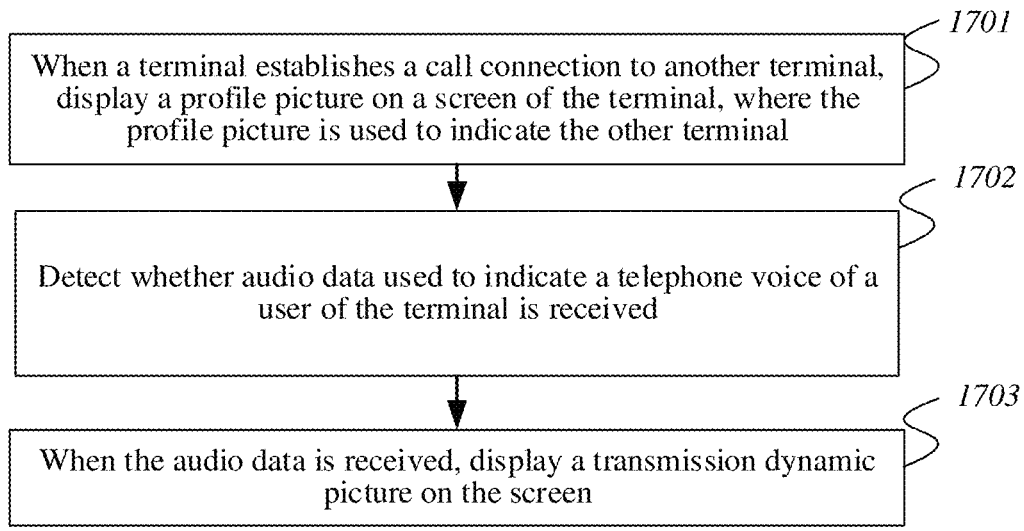
FIG. 17 is a schematic flowchart of an information display method according to an embodiment of the present disclosure.

FIG. 17 is a schematic flowchart of an information display method. The method may be performed by the terminal 800, and steps of the method are as follows.

Step 1701: When the terminal establishes a call connection to another terminal, display a profile picture on a screen of the terminal, where the profile picture is used to indicate the other terminal.

Step 1702: Detect whether audio data used to indicate a telephone voice of a user of the terminal is received.

Step 1703: When the audio data is received, display a transmission dynamic animation on the screen, where the transmission dynamic animation is a dynamic picture showing that an object graph appears at a start position on the screen, and the object graph moves to a position of the profile picture and then disappears at the position of the profile picture, and the object graph is used to indicate the audio data.

In some embodiments, when the audio data is from a device that has a microphone and that is in a wireless connection to the terminal, the start position may be a position of a radio signal icon on the screen, or when the audio data is from a device that has a microphone and that is in a wired connection to the terminal using a headset jack of the terminal, the start position may be on a boundary of the screen, the start position and the headset jack may be on a same side of a center of the screen, and the start position is in a plug direction of the headset jack, or when the audio data is from a microphone of the terminal, the start position may be on a boundary of the screen, and the start position and the microphone of the terminal may be on a same side of a center of the screen.

In some embodiments, there may be at least two object graphs.

In some embodiments, the method may further include, when a call on the call connection is completed, displaying a completion dynamic picture, where the completion dynamic picture may include a dynamic picture showing that a remaining object graph that is already displayed in the object graph and does not disappear moves to the position of the profile picture and then disappears at the position of the profile picture, or the completion dynamic picture may include a dynamic picture showing that the remaining object graph moves to the start position and then disappears at the start position. In the completion dynamic picture, a new object graph may no longer appear at the start position.

In the completion dynamic picture, transparency of the remaining object graph may gradually increase and then the remaining object graph may disappear, or in the completion dynamic picture, a color of the remaining object graph may change to a preset completion color.

In some embodiments, a current moving speed of the object graph may be in a positive correlation with a current speaking speed of the voice, or a current size of the object graph may be in a negative correlation with a current speaking speed of the voice, and a higher current speaking speed of the voice indicates a smaller current size of the object graph.

In some embodiments, when a current frequency of the voice is less than or equal to a preset low-frequency threshold, a shape of the object graph may be a preset low-frequency shape, or when a current frequency of the voice is greater than the low-frequency threshold and is less than a preset high-frequency threshold, a shape of the object graph may be a preset intermediate-frequency shape, or when a current frequency of the voice is greater than or equal to the high-frequency threshold, a shape of the object graph may be a preset high-frequency shape.

The method embodiment of the present disclosure is based on a same conception as the apparatus embodiment. For specific content, refer to descriptions of operations performed by corresponding components in the apparatus embodiment of the present disclosure, and details are not described herein again.

Figure 18:
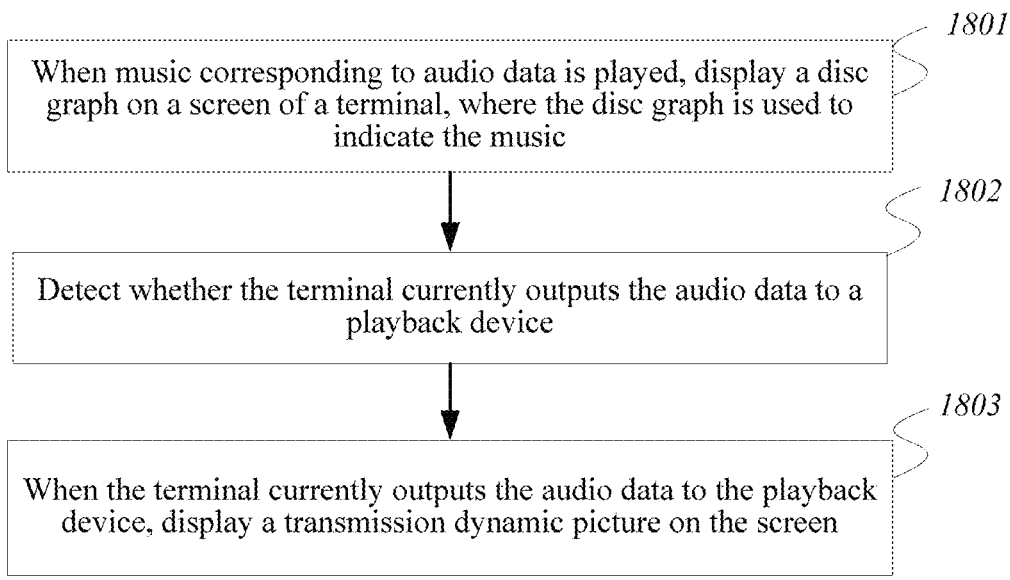
FIG. 18 is a schematic flowchart of an information display method according to an embodiment of the present disclosure.

FIG. 18 is a schematic flowchart of an information display method. The method may be performed by the terminal 1000, and steps of the method are as follows.

Step 1801: When music corresponding to audio data is played, display a disc graph on a screen of the terminal, where the disc graph is used to indicate the music.

Step 1802: Detect whether the terminal currently outputs the audio data to a playback device.

Step 1803: When the terminal currently outputs the audio data to the playback device, display a transmission dynamic animation on the screen, where the transmission dynamic animation is a dynamic picture showing that an object graph appears at a position of the disc graph on the screen of the terminal, and the object graph moves to an end position and then disappears at the end position, and the object graph is used to indicate the audio data.

In some embodiments, when the terminal is in a wireless connection to the playback device, and the terminal currently outputs the audio data to the playback device, the end position may be a position of a radio signal icon on the screen, or when the terminal is in a wired connection to the playback device using a headset jack, and the terminal currently outputs the audio data to the playback device, the end position may be on a boundary of the screen of the terminal, the end position and the headset jack are on a same side of a center of the screen, and the end position may be in a plug direction of the headset jack.

In some embodiments, the displaying a transmission dynamic animation may include displaying the transmission dynamic animation within preset duration.

In some embodiments, when a current frequency of the music is less than or equal to a preset low-frequency threshold, a shape of the object graph may be a preset low-frequency shape, or when a current frequency of the music is greater than the low-frequency threshold and is less than a preset high-frequency threshold, a shape of the object graph may be a preset intermediate-frequency shape, or when a current frequency of the music is greater than or equal to the high-frequency threshold, a shape of the object graph may be a preset high-frequency shape.

In some embodiments, a current moving speed of the object graph may be in a positive correlation with a current rhythm of the music, or a current size of the object graph may be in a negative correlation with a current rhythm of the music, and a faster current rhythm of the music may indicate a smaller current size of the object graph.

In some embodiments, in the transmission dynamic animation, a quantity of object graphs that appear per second may be in a positive correlation with resolution of the audio data.

In some embodiments, the method may further include, when the terminal currently does not output the audio data to the playback device, displaying a silent dynamic picture, where the silent dynamic picture may be a dynamic picture showing that a remaining object graph that is already displayed in the object graph and does not disappear moves to the end position and then disappears at the end position. In the silent dynamic picture, a new object graph may no longer appear at the position of the disc graph.

In some embodiments, the method may further include, when the music is paused, displaying a pause picture showing that the remaining object graph that is already displayed in the object graph and does not disappear stops moving. Transparency of the remaining object graph in the pause picture may be greater than transparency of the object graph in the transmission dynamic animation. Higher transparency indicates that the graph that is already displayed in the object graph and does not disappear is more transparent. In the pause picture, a new object graph may no longer appear at the position of the disc graph.

The method may further include when the play of the music is resumed, displaying a dynamic picture showing that a graph that is already displayed in the object graph and does not disappear moves to the end position and then disappears at the end position. In the dynamic picture, a new object graph may appear at the position of the disc graph.

The method embodiment of the present disclosure is based on a same conception as the apparatus embodiment. For specific content, refer to descriptions of operations performed by corresponding components in the apparatus embodiment of the present disclosure, and details are not described herein again.

Figure 19:
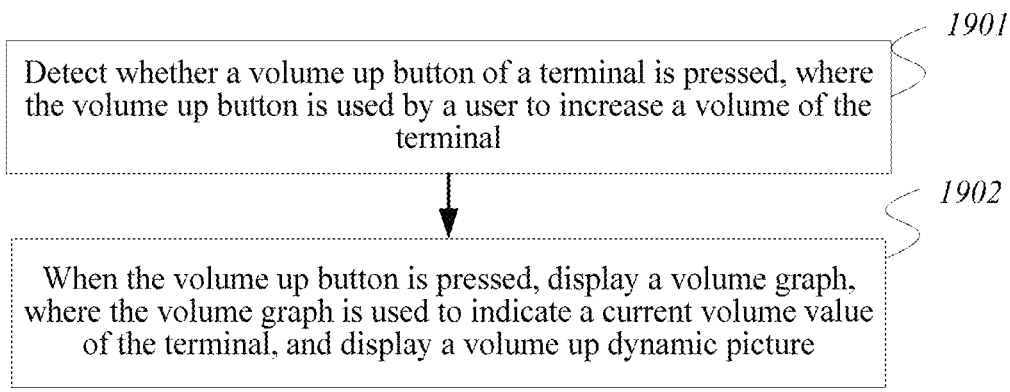
FIG. 19 is a schematic flowchart of an information display method according to an embodiment of the present disclosure.

FIG. 19 is a schematic flowchart of an information display method. The method may be performed by the terminal 1200, and steps of the method are as follows.

Step 1901: Detect whether a volume up button of the terminal is pressed, where the volume up button is used by a user to increase a volume of the terminal.

Step 1902: When the volume up button is pressed, display a volume up dynamic picture on the screen of the terminal, where the volume up dynamic picture is a dynamic picture showing that a volume up object graph appears at a start position on the screen, and the volume up object graph moves to a volume position on the screen and then disappears at the volume position, and the volume up object graph is used to indicate an instruction for increasing the volume.

In some embodiments, the method may further include displaying the volume graph on the screen of the terminal, where the volume graph is used to indicate a current volume of the terminal, and the volume position is the position of the volume graph.

In some embodiments, the start position may be on a boundary of the screen of the terminal, the start position and the volume up button of the terminal are on a same side of a center of the screen, and the start position is in a press direction of the volume up button.

In some embodiments, the method may further include detecting whether a volume down button of the terminal is pressed, where the volume up button is used by the user to reduce the volume of the terminal, when the volume down button is pressed, displaying a volume down dynamic picture, where the volume down dynamic picture may be a dynamic picture showing that a volume down object graph appears at the position of the volume graph, and the volume down object graph moves to an end position on the screen of the terminal and then disappears at the end position, and the volume down object graph may be used to indicate an instruction for reducing the volume.

The end position may be on a boundary of the screen of the terminal, the end position and the volume down button of the terminal may be on a same side of the center of the screen, and the end position may be in a press direction of the volume down button.

In some embodiments, the volume graph may be a circle, and a current radius of the volume graph may be in a positive correlation with the current volume of the terminal.

In some embodiments, when the volume up button is pressed once, a quantity of volume up object graphs that appear at the start position in the volume up dynamic picture may be a preset quantity.

In some embodiments, when the volume down button is pressed once, a quantity of volume down object graphs that appear at the position of the volume graph in the volume down dynamic picture may be a preset quantity.

The method embodiment of the present disclosure is based on a same conception as the apparatus embodiment. For specific content, refer to descriptions of operations performed by corresponding components in the apparatus embodiment of the present disclosure, and details are not described herein again.

Figure 20:
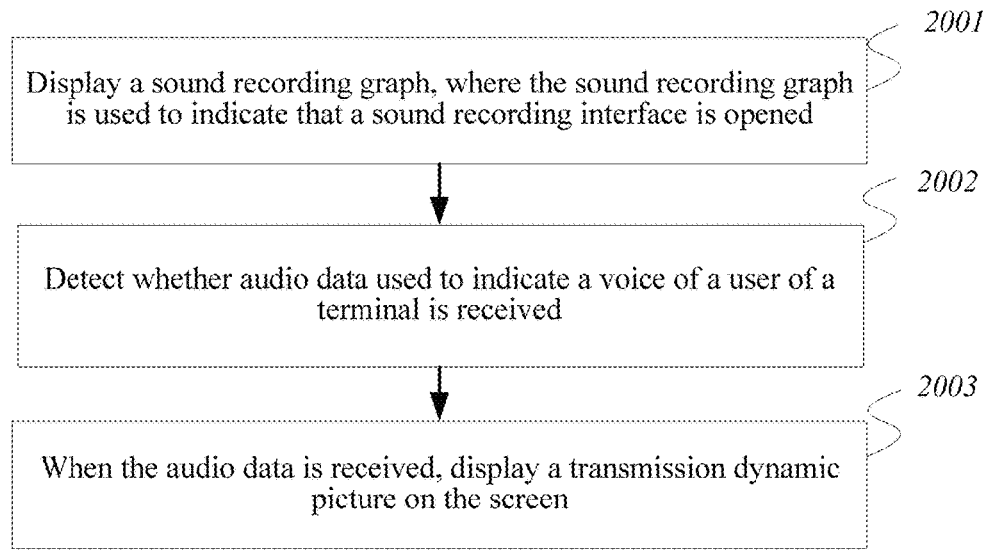
FIG. 20 is a schematic flowchart of an information display method according to an embodiment of the present disclosure.

FIG. 20 is a schematic flowchart of an information display method. The method may be performed by the terminal 1400, and steps of the method are as follows.

Step 2001: Display a sound recording graph on a screen of the terminal, where the sound recording graph is used to indicate that a sound recording interface is opened.

Step 2002: Detect whether audio data used to indicate a voice of a user of the terminal is received.

Step 2003: When the audio data is received, display a transmission dynamic animation on the screen, where the transmission dynamic animation is a dynamic picture showing that an object graph appears at a start position on the screen, and the object graph moves to the sound recording graph and then disappears at a position of the sound recording graph, and the object graph is used to indicate the audio data.

In some embodiments, when the audio data is from a device that has a microphone and that is in a wireless connection to the terminal, the start position may be a position of a radio signal icon on the screen, or when the audio data is from a device that has a microphone and that is in a wired connection to the terminal using a headset jack of the terminal, the start position may be on a boundary of the screen, the start position and the headset jack of the terminal may be on a same side of a center of the screen, and the start position may be in a plug direction of the headset jack, or when the audio data is from a microphone of the terminal, the start position may be on a boundary of the screen of the terminal, and the start position and the microphone of the terminal may be on a same side of a center of the screen.

The microphone of the terminal may include at least two microphones, and when the audio data is from any one of the at least two microphones, the start position and the any one of the microphones may be on a same side of the center of the screen. Further, the start position may be close to a position of any one of the microphones.

In some embodiments, there may be at least two object graphs.

In some embodiments, the method may further include when the sound recording function is completed or when the sound recording function is paused, displaying a completion dynamic picture. The completion dynamic picture may be a dynamic picture showing that a remaining object graph that is already displayed in the object graph and does not disappear moves to the position of the sound recording graph and then disappears at the position of the sound recording graph, or the completion dynamic picture may be a dynamic picture showing that the remaining object graph moves to the start position and then disappears at the start position. In the completion dynamic picture, a new object graph may no longer appear at the start position.

In some embodiments, a current moving speed of the object graph may be in a positive correlation with a current speaking speed of the voice, or a current size of the object graph is in a negative correlation with a current speaking speed of the voice, and a higher current speaking speed of the voice may indicate a smaller current size of the object graph.

In some embodiments, when a current frequency of the voice is less than or equal to a preset low-frequency threshold, a shape of the object graph may be a preset low-frequency shape, or when a current frequency of the voice is greater than the low-frequency threshold and is less than a preset high-frequency threshold, a shape of the object graph may be a preset intermediate-frequency shape, or when a current frequency of the voice is greater than or equal to the high-frequency threshold, a shape of the object graph may be a preset high-frequency shape.

The method embodiment of the present disclosure is based on a same conception as the apparatus embodiment. For specific content, refer to descriptions of operations performed by corresponding components in the apparatus embodiment of the present disclosure, and details are not described herein again.

Figure 21:
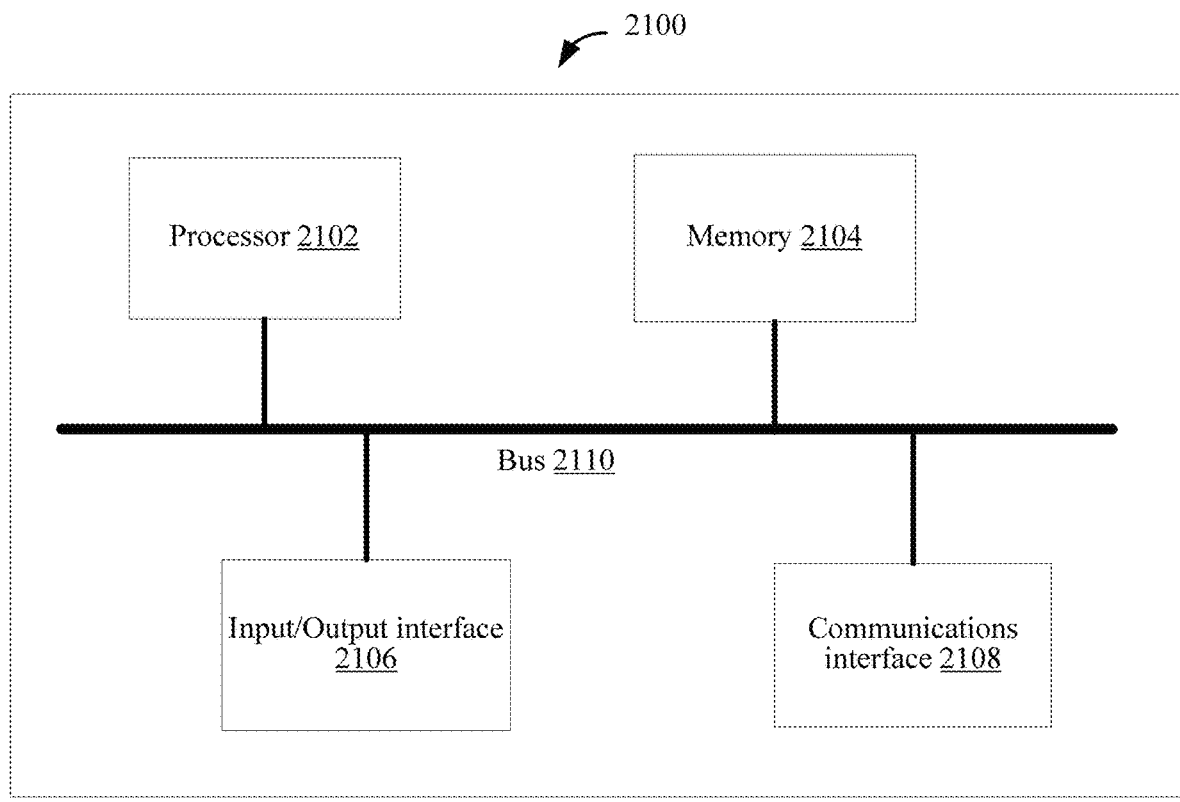
FIG. 21 is a schematic diagram of a logical structure of a computer device according to an embodiment of the present disclosure.

FIG. 21 is a schematic diagram of a hardware structure of a computer device 2100 according to an embodiment of the present disclosure. As shown in FIG. 21, the computer device 2100 may be used as an implementation of at least one of the terminal 300, the terminal 800, the terminal 1000, the terminal 1200, and the terminal 1400. The computer device 2100 includes a processor 2102, a memory 2104, an input/output interface 2106, a communications interface 2108, and a bus 2110. The processor 2102, the memory 2104, the input/output interface 2106, and the communications interface 2108 communicate with and connect to each other using the bus 2110.

The processor 2102 may use a general CPU, a microprocessor, an application-specific integrated circuit (ASIC), or one or more integrated circuits, and is configured to execute a related program to implement the technical solutions provided in the embodiments of the present disclosure.

The memory 2104 may be a read-only memory (ROM), a static storage device, a dynamic storage device, or a RAM. The memory 2104 may store an operating system and another application program. Functions that need to be performed by modules and components included in at least one of the terminal 300, the terminal 800, the terminal 1000, the terminal 1200, and the terminal 1400 provided in the embodiments of the present disclosure are implemented using software or firmware, or program code used to implement the foregoing methods provided in the method embodiments of the present disclosure is stored in the memory 2104, and the processor 2102 reads the code in the memory 2104 to perform operations that need to be performed by modules and components included in at least one of the terminal 300, the terminal 800, the terminal 1000, the terminal 1200, and the terminal 1400, or perform the foregoing methods provided in the method embodiments of the present disclosure.

The input/output interface 2106 is configured to receive input data and information, and output data such as an operation result. The input/output interface 2106 may output display data to a display such that the display visually presents the display data.

The communications interface 2108 uses, for example, but not limited to, a transceiver apparatus such as a transceiver, to implement commutation between the computer device 2100 and another device or a communications network.

The bus 2110 may include paths for transmitting information between various components (for example, the processor 2102, the memory 2104, the input/output interface 2106, and the communications interface 2108) of the computer device 2100.

The computer device 2100 further includes a display configured to display various graphs and dynamic pictures described in the embodiments of the present disclosure.

It should be noted that, although for the computer device 2100 shown in FIG. 21, only the processor 2102, the memory 2104, the input/output interface 2106, the communications interface 2108, and the bus 2110 are shown, in a specific implementation process, a person skilled in the art should understand that the computer device 2100 may further include other devices required for implementing normal running. In addition, according to specific requirements, a person skilled in the art should understand that the computer device 2100 may further include a hardware device for implementing another additional function. In addition, a person skilled in the art should understand that, the computer device 2100 may include only components required for implementing the embodiments of the present disclosure, without a need of including all components shown in FIG. 21.

It should be noted that, to make the description brief, the foregoing method embodiments are expressed as a series of actions. However, a person skilled in the art should appreciate that the present disclosure is not limited to the described action sequence, because according to the present disclosure, some steps may be performed in other sequences or performed simultaneously. In addition, a person skilled in the art should also appreciate that the actions and modules involved in this specification are not necessarily mandatory to the present disclosure.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include a magnetic disk, an optical disc, a ROM, or a RAM.

Although the present disclosure is described with reference to the embodiments, in a process of implementing the present disclosure that claims protection, a person skilled in the art may understand and implement other variations of the disclosed embodiments by viewing the accompanying drawings, disclosed content, and the accompanying claims. In the claims, "comprising" does not exclude another component or another step, and "a" or "one" does not exclude a case of a plurality. A single processor or another module may implement several functions enumerated in the claims. The fact that specific measures are recited in mutually different dependent claims does not indicate that a combination of these measures cannot bring better effects. The computer program may be stored/distributed in a proper medium, for example, an optical storage medium or a solid state medium, and is provided as or used as a part of the hardware together with other hardware, or may use another distribution form, such as using the Internet or another wired or wireless telecommunications system.

Specific examples are used in this specification to describe the principle and implementations of the present disclosure. The descriptions of the foregoing embodiments are merely intended to help understand the method and idea of the present disclosure. In addition, with respect to the implementations and the application scope, modifications may be made by a person of ordinary skill in the art according to the idea of the present disclosure. Therefore, this specification shall not be construed as a limitation on the present disclosure.

What is claimed is:

1. An information display method, performed by a terminal, method comprising:
    detecting that the terminal is currently coupled to an external device using a charging cable or through wireless charging;
    transmitting a transmission object between the terminal and the external device in response to the terminal being currently coupled to the external device, wherein the transmission object comprises electric energy; and
    displaying a progress graph and a transmission dynamic animation on a screen of the terminal when the transmission object is transmitted between the terminal and the external device, wherein the progress graph indicates a current transmission progress of the transmission object, wherein the transmission dynamic animation comprises an object graph that moves from a start position on the screen to an end position on the screen and disappears at the end position, wherein the object graph indicates the transmission object, wherein the start position is a position on the screen corresponding to the external device and the end position is a position of the progress graph when a transmission direction of the transmission object is from the external device to the terminal, and wherein the start position is the position of the progress graph and the end position is the position on the screen corresponding to the external device when the transmission direction of the transmission object is from the terminal to the external device, wherein the start position is on a boundary of the screen, wherein the start position and a charging interface of the terminal are on a same side of a center of the screen, the start position is in a plug direction of the charging interface, and the end position is the position of the progress graph when the terminal is currently coupled to the charging device using the charging cable, wherein the start position is on each of two sides of the screen and the end position is the position of the progress graph when the terminal is currently coupled to the charging device through the wireless charging, and wherein at least one of a current moving speed of the object graph or a current size of the object graph is in a positive correlation with a voltage currently provided by the charging device or a current input into the terminal.

2. The information display method of claim 1, further comprising displaying a completion dynamic picture when the transmission object has completed being transmitted, and wherein the completion dynamic picture comprises:
    a dynamic picture showing that a remaining object graph already displayed in the object graph that does not disappear moves to the end position and disappears at the end position; or the dynamic picture showing that the remaining object graph moves to the start position and disappears at the start position.

3. The information display method of claim 2, wherein the completion dynamic picture further comprises:
gradually increasing transparency of the remaining object graph and disappearing the remaining object graph; or
changing a color of the remaining object graph to a preset completion color.

4. The information display method of claim 1, further comprising displaying a pause picture showing that a remaining object graph already displayed in the object graph that does not disappear stops moving when transmission of the transmission object is paused.

5. The information display method of claim 4, further comprising displaying a dynamic picture showing that the remaining object graph moves to the end position and disappears at the end position when the transmission of the transmission object is resumed.

6. The information display method of claim 1, wherein displaying the transmission dynamic animation comprises displaying the transmission dynamic animation within a preset duration.

7. The information display method of claim 2, wherein displaying the completion dynamic picture comprises displaying the completion dynamic picture within a preset duration.

8. The information display method of claim 1, wherein the progress graph is a circle, and wherein a current radius of the progress graph is in a positive correlation with a current electricity quantity of the terminal.

9. The information display method of claim 1 wherein a color of the object graph is a first preset color indicating a low electricity quantity when a current electricity quantity of the terminal is less than or equal to a preset low-electricity-quantity threshold, wherein the color of the object graph is a second preset color indicating a medium electricity quantity when the current electricity quantity of the terminal is greater than the low-electricity-quantity threshold and is less than a preset high-electricity-quantity threshold, and wherein the color of the object graph is a third preset color indicating a high electricity quantity when the current electricity quantity of the terminal is greater than or equal to the high-electricity-quantity threshold.

10. The information display method of claim 1, wherein the data information is an installation file of an application or an update file of the application, wherein a transmission direction of the data information is from the external device to the terminal, wherein the progress graph is an icon for a download status of the application or an icon for an update status of the application, wherein the icon for the download status displays a current download progress, and wherein the icon for the update status displays a current update progress.

11. A terminal, comprising:
a memory storage configured to store instructions; and
one or more processors coupled to the memory storage, wherein the one or more processors execute the instructions to:
detect that the terminal is currently coupled to an external device using a charging cable or through wireless charging;
transmit a transmission object between the terminal and the external device in response to the terminal being currently coupled to the external device, wherein the transmission object comprises electric energy; and
display a progress graph and a transmission dynamic animation on a screen of the terminal when the transmission object is transmitted between the terminal and the external device, wherein the progress graph indicates a current transmission progress of the transmission object, wherein the transmission dynamic animation comprises an object graph that moves from a start position on the screen to an end position on the screen and disappears at the end position, wherein the object graph indicates the transmission object, wherein the start position is a position on the screen corresponding to the external device and the end position is a position of the progress graph when a transmission direction of the transmission object is from the external device to the terminal, wherein the start position is the position of the progress graph and the end position is the position on the screen corresponding to the external device when the transmission direction of the transmission object is from the terminal to the external device, wherein the start position is on a boundary of the screen, wherein the start position and a charging interface of the terminal are on a same side of a center of the screen, the start position is in a plug direction of the charging interface, and the end position is the position of the progress graph when the terminal is currently coupled to the charging device using the charging cable, wherein the start position is on each of two sides of the screen and the end position is the position of the progress graph when the terminal is currently coupled to the charging device through the wireless charging, and wherein at least one of a current moving speed of the object graph or a current size of the object graph is in a positive correlation with a voltage currently provided by the charging device or a current input into the terminal.

12. The terminal of claim 11, wherein the progress graph is a circle, and wherein a current radius of the progress graph is in a positive correlation with a current electricity quantity of the terminal.

13. The terminal of claim 11, wherein a color of the object graph is a first preset color indicating a low electricity quantity when a current electricity quantity of the terminal is less than or equal to a preset low-electricity-quantity threshold, wherein the color of the object graph is a second preset color indicating a medium electricity quantity when the current electricity quantity of the terminal is greater than the preset low-electricity-quantity threshold and is less than a preset high-electricity-quantity threshold, and wherein the color of the object graph is a third preset color indicating a high electricity quantity when the current electricity quantity of the terminal is greater than or equal to the preset high-electricity-quantity threshold.

14. A non-transitory computer program storage medium, comprising instructions when executed by one or more processors cause the one or more processors to:
detect that a terminal is currently coupled to an external device using a charging cable or through wireless charging;
transmit a transmission object between the terminal and the external device in response to the terminal being currently coupled to the external device, wherein the transmission object comprises electric energy; and
display a progress graph and a transmission dynamic animation on a screen of the terminal when the transmission object is transmitted between the terminal and the external device, wherein the progress graph indicates a current transmission progress of the transmission object, wherein the transmission dynamic animation comprises an object graph that moves from a start position on the screen to an end position on the screen and disappears at the end position, wherein the object graph indicates the transmission object, wherein the start position is a position on the screen corresponding to the external device and the end position is a position of the progress graph when a transmission direction of the transmission object is from the external device to the terminal, wherein the start position is the position of the progress graph and the end position is the position on the screen corresponding to the external device when the transmission direction of the transmission object is from the terminal to the external device, wherein the start position is on a boundary of the screen, wherein the start position and a charging interface of the terminal are on a same side of a center of the screen, the start position is in a plug direction of the charging interface, and the end position is the position of the progress graph when the terminal is currently coupled to the charging device using the charging cable, wherein the start position is on each of two sides of the screen and the end position is the position of the progress graph when the terminal is currently coupled to the charging device through the wireless charging, and wherein at least one of a current moving speed of the object graph or a current size of the object graph is in a positive correlation with a voltage currently provided by the charging device or a current input into the terminal.

15. An information display method, performed by a terminal, comprising:
detecting whether the terminal is currently wirelessly coupled to an external device;
transmitting a transmission object between the terminal and the external device in response to the terminal being currently coupled to the external device, wherein the transmission object comprises data information; and
displaying a progress graph and a transmission dynamic animation on a screen of the terminal when the transmission object is transmitted between the terminal and the external device, wherein the progress graph indicates a current transmission progress of the transmission object, wherein the transmission dynamic animation comprises an object graph that moves from a start position on the screen to an end position on the screen and disappears at the end position, wherein the object graph indicates the transmission object, wherein the start position is a position on the screen corresponding to the external device and the end position is a position of the progress graph when a transmission direction of the transmission object is from the external device to the terminal, wherein the start position is the position of the progress graph and the end position is the position on the screen corresponding to the external device when the transmission direction of the transmission object is from the terminal to the external device, wherein the position on the screen corresponding to the external device comprises a position of a radio signal icon on the screen, and wherein at least one of a current moving speed of the object graph or a current size of the object graph is in a positive correlation with a current transmission speed of the data information.

16. The information display method of claim 15, wherein at least one of a current moving speed of the object graph or a current size of the object graph is in a positive correlation with a voltage currently provided by the charging device, or a current input into the terminal.

17. A terminal, comprising:
a memory storage configured to store instructions; and
one or more processors coupled to the memory storage, wherein the one or more processors execute the instructions to:
detect whether the terminal is currently wirelessly coupled to an external device;
transmit a transmission object between the terminal and the external device in response to the terminal being currently coupled to the external device, wherein the transmission object comprises data information; and
display a progress graph and a transmission dynamic animation on a screen of the terminal when the transmission object is transmitted between the terminal and the external device, wherein the progress graph indicates a current transmission progress of the transmission object, wherein the transmission dynamic animation comprises an object graph that moves from a start position on the screen to an end position on the screen and disappears at the end position, wherein the object graph indicates the transmission object, wherein the start position is a position on the screen corresponding to the external device and the end position is a position of the progress graph when a transmission direction of the transmission object is from the external device to the terminal, wherein the start position is the position of the progress graph and the end position is the position on the screen corresponding to the external device when the transmission direction of the transmission object is from the terminal to the external device, wherein the position on the screen corresponding to the external device comprises a position of a radio signal icon on the screen, and wherein at least one of a current moving speed of the object graph or a current size of the object graph is in a positive correlation with a current transmission speed of the data information.

18. The terminal of claim 17, wherein the data information is an installation file of an application or an update file of the application, wherein a transmission direction of the data information is from the external device to the terminal, wherein the progress graph is an icon for a download status of the application or an icon for an update status of the application, wherein the icon for the download status displays a current download progress, and wherein the icon for the update status displays a current update progress.

19. A non-transitory computer program storage medium, comprising instructions when executed by one or more processors, cause the one or more processors to:
detect whether the terminal is currently wirelessly coupled to an external device;
transmit a transmission object between the terminal and the external device in response to the terminal being currently coupled to the external device, wherein the transmission object comprises data information; and
display a progress graph and a transmission dynamic animation on a screen of the terminal when the transmission object is transmitted between the terminal and the external device, wherein the progress graph indicates a current transmission progress of the transmission object, wherein the transmission dynamic animation comprises an object graph that moves from a start position on the screen to an end position on the screen and disappears at the end position, wherein the object graph indicates the transmission object, wherein the start position is a position on the screen corresponding to the external device and the end position is a position of the progress graph when a transmission direction of the transmission object is from the external device to the terminal, wherein the start position is the position of the progress graph and the end position is the position on the screen corresponding to the external device when the transmission direction of the transmission object is from the terminal to the external device, wherein the position on the screen corresponding to the external device comprises a position of a radio signal icon on the screen, and wherein at least one of a current moving speed of the object graph or a current size of the object graph is in a positive correlation with a current transmission speed of the data information.

20. The non-transitory computer program storage medium according to claim 19, wherein the data information is an installation file of an application or an update file of the application, wherein a transmission direction of the data information is from the external device to the terminal, wherein the progress graph is an icon for a download status of the application or an icon for an update status of the application, wherein the icon for the download status displays a current download progress, and wherein the icon for the update status displays a current update progress.

* * * * *